United States Patent
Nakahara et al.

(10) Patent No.: US 9,964,669 B2
(45) Date of Patent: May 8, 2018

(54) FILM

(71) Applicant: KURARAY CO., LTD., Kurashiki-shi (JP)

(72) Inventors: Atsuhiro Nakahara, Tainai (JP); Toru Abe, Tainai (JP); Yusaku Nomoto, Tainai (JP); Wataru Tsuji, Tainai (JP); Yuuki Takasuka, Tainai (JP); Takao Hoshiba, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 0 days. days.

(21) Appl. No.: 15/113,736

(22) PCT Filed: Jan. 23, 2015

(86) PCT No.: PCT/JP2015/051766
§ 371 (c)(1),
(2) Date: Jul. 22, 2016

(87) PCT Pub. No.: WO2015/111682
PCT Pub. Date: Jul. 30, 2015

(65) Prior Publication Data
US 2017/0010390 A1    Jan. 12, 2017

(30) Foreign Application Priority Data
Jan. 23, 2014 (JP) ................. 2014-010844

(51) Int. Cl.
| G02B 1/14 | (2015.01) |
| G02B 5/30 | (2006.01) |
| C08J 5/18 | (2006.01) |
| C08L 33/12 | (2006.01) |
| C08L 69/00 | (2006.01) |

(52) U.S. Cl.
CPC .................... *G02B 1/14* (2015.01); *C08J 5/18* (2013.01); *C08L 33/12* (2013.01); *C08L 69/00* (2013.01); *G02B 5/3033* (2013.01); *C08J 2333/12* (2013.01); *C08J 2469/00* (2013.01)

(58) Field of Classification Search
CPC ...... G02B 1/14; G02B 5/3033; G02B 5/3083; C08J 5/18; C08L 33/12; C08L 69/00; C08F 120/14
USPC ................. 359/487.02, 489.07; 349/96, 117; 524/523; 525/133
See application file for complete search history.

(56) References Cited

U.S. PATENT DOCUMENTS

| 5,280,070 | A | 1/1994 | Drzewinski | |
| 8,829,099 | B2 * | 9/2014 | Kumazawa | C08F 285/00 523/200 |
| 9,605,121 | B2 * | 3/2017 | Takahashi | C08L 33/12 |
| 9,683,148 | B2 * | 6/2017 | Nakada | C09J 153/00 |
| 2003/0130421 | A1 * | 7/2003 | Sato | C08L 25/06 525/68 |
| 2011/0269910 | A1 | 11/2011 | Chun et al. | |
| 2013/0144023 | A1 | 6/2013 | Kim et al. | |
| 2016/0090479 | A1 * | 3/2016 | Takahashi | G02B 5/3083 524/523 |
| 2016/0096937 | A1 * | 4/2016 | Takahashi | C08F 120/14 525/185 |
| 2016/0122603 | A1 * | 5/2016 | Nakada | C08F 4/52 525/249 |

FOREIGN PATENT DOCUMENTS

| JP | 57-32942 A | 7/1982 |
| JP | 6-128475 A | 5/1994 |
| JP | 3048183 B2 | 6/2000 |
| JP | 2010-241883 A | 10/2010 |
| JP | 2012-51997 A | 3/2012 |
| JP | 2012-514759 | 6/2012 |
| JP | 2012-201831 A | 10/2012 |
| JP | 2013-148655 | 8/2013 |
| JP | 2013-534942 A | 9/2013 |
| WO | WO2014/185508 A1 | 11/2014 |

OTHER PUBLICATIONS

International Search Report dated Apr. 14, 2015 in corresponding PCT/JP2015/051766.

* cited by examiner

*Primary Examiner* — Frank Font
(74) *Attorney, Agent, or Firm* — Oblon, McClelland, Maier & Neustadt, L.L.P.

(57) ABSTRACT

A film obtained by molding a methacrylic resin composition, the methacrylic resin composition comprises: a methacrylic resin having a triad syndiotacticity (rr) of not less than 50% and a weight average molecular weight of 80000 to 200000 and comprising not less than 92% by mass of a structural unit derived from methyl methacrylate, and a polycarbonate resin having a melt volume-flow rate of 130 to 250 cm$^3$/20 min at 300° C. and 1.2 Kg, in which a mass ratio of the methacrylic resin to the polycarbonate resin is 91/9 to 99/1, and the total content of the methacrylic resin and the polycarbonate resin is 80 to 100% by mass. The film is layered to at least one surface of a polarizer to give a polarizing plate.

20 Claims, 1 Drawing Sheet

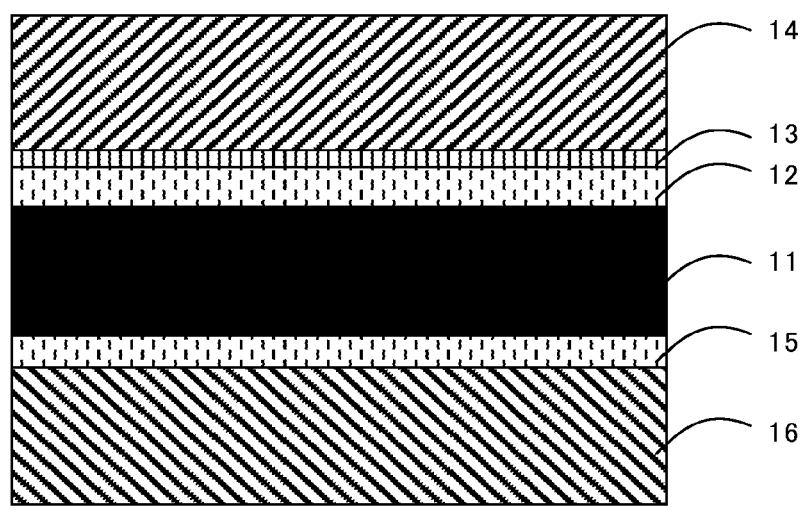

FILM

TECHNICAL FIELD

The present invention relates to a film. More specifically, the present invention relates to a film that comprises a methacrylic resin composition comprising a methacrylic resin and a polycarbonate resin and has excellent transparency, small retardation in the thickness direction, a low heat shrinkage ratio, a uniform thickness and a high surface smoothness.

BACKGROUND ART

Various resin films are used in a liquid crystal display. Among the films, a polarizer protective film is usually made from triacetylcellulose. Triacetylcellulose films have high moisture permeability. Therefore, making the triacetylcellulose film thinner tends to impair the quality of the polarizer. As liquid crystal displays are made thinner, the polarizer protective film should be improved.

As a new material of the polarizer protective film, a methacrylic resin is being researched. A film comprising a methacrylic resin is known to have its toughness increased when stretched (see Patent Document 1). However, when an ordinary methacrylic resin film is stretched, its retardation becomes greater, leading to impaired quality of an IPS liquid crystal display.

It is known that a combined use of a methacrylic resin with a polycarbonate resin or the like tends to give a film having small retardation (Patent Documents 2 to 4). However, the methacrylic resins used in these methods have undergone copolymerization with an aromatic vinyl monomer or an imide monomer for enhanced heat resistance, and are consequently poor in strength. As a result, films made with the methacrylic resins easily break and are not suitable as optical films.

CITATION LIST

Patent Literatures

Patent Document 1: JP S57-32942 B
Patent Document 2: JP 3048183 B
Patent Document 3: JP 2012-514759 A
Patent Document 4: JP 2013-148655 A

SUMMARY OF THE INVENTION

Problems to be Resolved by the Invention

An object of the present invention is to provide a film that comprises a methacrylic resin composition comprising a methacrylic resin and a polycarbonate resin and has excellent transparency, small retardation in the thickness direction, a low heat shrinkage ratio, a uniform thickness, and a high surface smoothness.

Means for Solving the Problems

To achieve the object, the present invention has been completed that includes the following embodiments.
[1] A film comprising a methacrylic resin composition, the methacrylic resin composition comprising:
a methacrylic resin having a triad syndiotacticity (rr) of not less than 50% and a weight average molecular weight of 80000 to 200000 and comprising not less than 92% by mass of a structural unit derived from methyl methacrylate, and
a polycarbonate resin having an MVR of 130 to 250 $cm^3$/10 min at 300° C. and 1.2 Kg;
in which a mass ratio of the methacrylic resin to the polycarbonate resin is from 91/9 to 99/1, and the total content of the methacrylic resin and the polycarbonate resin is from 80 to 100% by mass.
[2] The film according to the embodiment [1], having a thickness of 10 to 50 µm.
[3] The film according to the embodiment [1] or [2], wherein the methacrylic resin has the syndiotacticity (rr) of not less than 58% and not more than 85%.
[4] The film according to any one of the embodiments [1] to [3], wherein the methacrylic resin comprises not less than 99% by mass of the structural unit derived from methyl methacrylate.
[5] The film according to any one of the embodiments [1] to [4], the film being a biaxially stretched film having an area based draw ration of 1.5 to 8.
[6] A polarizer protective film, comprising the film according to any one of the embodiments [1] to [5].
[7] A polarizing plate, comprising a polarizer and at least one of the polarizer protective film according to the embodiment [6] layered on the polarizer.

Advantageous Effects of the Invention

The film of the present invention has the following features.
1) Excellent transparency, which is attributable to excellent compatibility between a methacrylic resin and a polycarbonate resin and the consequent homogeneity in the order of nanometers.
2) Small retardation in the thickness direction even when stretched.
3) Excellent heat resistance, giving a low heat shrinkage ratio.
4) Small thickness obtainable.
5) Excellent film uniformity as a thin film.
6) Low tendency toward thermal decomposition, giving a wide range of film-forming conditions to choose from, eventually leading to a high surface smoothness.

The film of the present invention having these features, therefore is suitable as a polarizer protective film, a liquid crystal protective plate, a surface material for a mobile information terminal, a protective film for a display of a mobile information terminal, a light guide film, a front plate of various displays, or the like.

BRIEF DESCRIPTION OF THE DRAWINGS

FIG. 1 an illustration of a polarizing plate according to a preferable embodiment of the present invention.

EMBODIMENTS FOR CARRYING OUT THE INVENTION

The film of the present invention is a film that comprises a methacrylic resin composition comprising a methacrylic resin and a polycarbonate resin.

As for the methacrylic resin used in the present invention, the lower limit to the triad syndiotacticity (rr) is 50%, preferably 55%, more preferably 58%, further preferably 59%, and most preferably 60%. From the viewpoint of film-forming properties, the upper limit to the triad syndiotacticity (rr) of the methacrylic resin is preferably 99%, more preferably 85%, further preferably 77%, even further preferably 70%, even further preferably 65%, and most preferably 64%.

The triad syndiotacticity (rr) (hereinafter, sometimes simply called "syndiotacticity (rr)") refers to the probability that three adjacent structural units (triad) have two sets of diads that are both racemo diads (expressed as rr). Here, a pair of adjacent structural units (diad) that are present in a polymer molecule and have an identical configuration is called a meso diad, and the same pair but having opposite configurations is called a racemo diad, respectively expressed as m or r.

The syndiotacticity (rr) (%) of the methacrylic resin can be determined by obtaining a $^1$H-NMR spectrum in deuterated chloroform at 30° C., using the resulting spectrum to determine the area of the 0.6-0.95 ppm region (X) and the area of the 0.6-1.35 ppm region (Y) with the spectrum of TMS being taken as 0 ppm, and performing calculation by a formula: (X/Y)×100.

The methacrylic resin used in the present invention has a weight average molecular weight (hereinafter, sometimes called "Mw") of preferably 80000 to 200000, more preferably 85000 to 160000, and further preferably 90000 to 120000. With the Mw being not less than 80000 and the syndiotacticity (rr) being not less than 50%, the resulting film has excellent strength, does not easily break, and is easily stretched. Consequently, the film can be made even thinner. With the Mw being not more than 200000, the methacrylic resin has high forming processability, and the resulting film tends to have a uniform thickness and a high surface smoothness.

The methacrylic resin used in the present invention has a ratio of the Mw to the number average molecular weight (hereinafter, sometimes called "Mn") (Mw/Mn: hereinafter, this value is sometimes called "molecular weight distribution") of preferably 1.2 to 2.0, and more preferably 1.3 to 1.7. When the molecular weight distribution is not less than 1.2, the fluidity of the methacrylic resin is improved and the resulting film tends to have a high surface smoothness. When the molecular weight distribution is not more than 2.0, the resulting film tends to have excellent impact resistance and excellent toughness. The Mw and the Mn are values in terms of the molecular weight of standard polystyrene, determined based on a chromatogram obtained by gel permeation chromatography (GPC).

The methacrylic resin used in the present invention has a melt flow rate of preferably 0.1 to 5 g/10 min, further preferably 0.5 to 4 g/10 min, and most preferably 1.0 to 3 g/10 min as measured according to JIS K7210 under conditions of 230° C. and 3.8 kg load.

From the viewpoint of the heat resistance of the resulting film, the methacrylic resin used in the present invention comprises a structural unit derived from methyl methacrylate in an amount of not less than 92% by mass, more preferably not less than 95% by mass, further preferably not less than 97% by mass, particularly preferably not less than 99% by mass, and most preferably 100% by mass relative to the mass of the methacrylic resin.

The methacrylic resin used in the present invention may also comprise a structural unit other than the structural unit derived from methyl methacrylate. Examples thereof include a structural unit derived from a vinyl monomer having only one polymerizable carbon-carbon double bond per molecule, including acrylic acid alkyl esters such as methyl acrylate, ethyl acrylate, propyl acrylate, butyl acrylate, 2-ethylhexyl acrylate or the like; aryl acrylate esters such as phenyl acrylate or the like; cycloalkyl acrylate esters such as cyclohexyl acrylate, norbornenyl acrylate or the like; acrylamide; methacrylamide; acrylonitrile; methacrylonitrile; and the like.

The methacrylic resin used in the present invention has a glass transition temperature of preferably not less than 120° C., more preferably not less than 123° C., and further preferably not less than 124° C. The upper limit to the glass transition temperature of the methacrylic resin is usually 130° C. The glass transition temperature can be controlled by regulating the molecular weight and the syndiotacticity (rr). When the glass transition temperature is within this range, the resulting film is less likely to have deformation such as heat shrinkage.

The method for producing the methacrylic resin is not particularly limited. For example, by employing a known polymerization method such as the radical polymerization method or the anionic polymerization method, and selecting the polymerization temperature, the polymerization time, the type and the amount of a chain transfer agent, the type and the amount of a polymerization initiator, and the like, a methacrylic resin can be produced that has an Mw, a proportion of components having high molecular weights, a proportion of components having low molecular weights, a syndiotacticity (rr), and other properties being within the ranges specified by the present invention.

For example, in the radical polymerization method, the polymerization temperature is preferably not more than 80° C., more preferably not more than 70° C., and further preferably not more than 60° C. With the temperature being thus regulated, it is easy to enlarge a syndiotacticity (rr).

In the anionic polymerization method, an alkyllithium such as n-butyllithium, sec-butyllithium, isobutyllithium, tert-butyllithium or the like is preferably used as the polymerization initiator. From the viewpoint of productivity, the anionic polymerization is preferably performed in the presence of an organic aluminum compound. As the organic aluminum, mentioned can be a compound represented by the formula:

(where each of $R^1$, $R^2$ and $R^3$ is independently an alkyl group optionally having a substituent, a cycloalkyl group optionally having a substituent, an aryl group optionally having a substituent, an aralkyl group optionally having a substituent, an alkoxyl group optionally having a substituent, an aryloxy group optionally having a substituent, or an N,N-disubstituted amino group, and $R^2$ and $R^3$ may be bonded to each other to form an arylenedioxy group optionally having a substituent). Specific examples thereof include isobutylbis(2,6-di-tert-butyl-4-methylphenoxy)aluminum, isobutylbis(2,6-di-tert-butylphenoxy)aluminum, isobutyl[2,2'-methylenebis (4-methyl-6-tert-butylphenoxy)]aluminum, and the like.

The anionic polymerization method can be performed in the presence of an ether, a nitrogen-containing compound, or the like so as to control a polymerization reaction.

When the methacrylic resin is produced by the anionic polymerization method, a polymerization retarder can be added in the middle of the polymerization reaction in an amount less than the amount of the polymerization initiator, to be more specific, preferably from 1 mol % to 50 mol %, more preferably from 2 mol % to 20 mol %, and further preferably from 5 mol % to 10 mol % relative to the amount of the polymerization initiator. Alternatively, an additional polymerization initiator can be added in the middle of the polymerization reaction in an amount preferably from 1 mol % to 50 mol %, more preferably from 2 mol % to 20 mol %, and further preferably from 5 mol % to 10 mol % relative to the amount of the polymerization initiator initially added. Thereby, the weight average molecular weight can be modulated.

As another method for producing the methacrylic resin, for example, mentioned is a method comprising appropriately mixing a plurality of methacrylic resins having any of its properties such as the weight average molecular weight and the syndiotacticity (rr) outside the ranges specified by the present invention to obtain a methacrylic resin having its properties such as the weight average molecular weight and the syndiotacticity (rr) within the ranges specified by the present invention. In this method, the process is easily controlled. The plurality of methacrylic resins can be mixed by a known method, for example, in a melt-kneading apparatus such as a kneader ruder, an extruder, a mixing roll, a Banbury mixer or the like. The temperature during kneading can be appropriately regulated depending on the melting temperatures of the methacrylic resins used, and is usually 150° C. to 300° C.

Another method of producing the methacrylic resin is a method comprising polymerizing monomers in the presence of a methacrylic resin having any of its properties outside the ranges specified by the present invention to produce a methacrylic resin having its properties such as the weight average molecular weight and the syndiotacticity (rr) within the ranges specified by the present invention. The polymerization in this method can be performed in the same manner as in the radical polymerization method and the anionic polymerization method described above. In this method comprising polymerizing monomers in the presence of a methacrylic resin having any of its properties outside the ranges specified by the present invention, the thermal history experienced by the methacrylic resin is shorter than in the method of mixing a plurality of methacrylic resins, and consequently thermal decomposition of the methacrylic resin is suppressed, whereby a film having a low level of discoloration and a small number of foreign bodies tends to be obtained.

Preferable among these methods of producing the methacrylic resin, from the viewpoint that a methacrylic resin having high transparency can be easily produced, are a method comprising performing the anionic polymerization method to produce a methacrylic resin having its properties within the specified ranges; a method comprising mixing a methacrylic resin produced by the anionic polymerization method and a methacrylic resin produced by radical polymerization to produce a methacrylic resin having its properties within the specified ranges; and a method comprising mixing a methacrylic resin produced by the anionic polymerization method and another methacrylic resin also produced by the anionic polymerization method to produce a methacrylic resin having its properties within the ranges specified by the present invention. A more preferable method is the method comprising mixing a methacrylic resin produced by the anionic polymerization method and a methacrylic resin produced by radical polymerization to produce a methacrylic resin having its properties within the ranges specified by the present invention.

The polycarbonate resin used in the present invention is a polymer obtained by a reaction between a polyfunctional hydroxy compound and a carbonic-ester-formable compound. From the viewpoints of excellent compatibility with the methacrylic resin and excellent transparency of the resulting film, the polycarbonate resin is preferably an aromatic polycarbonate resin.

From the viewpoints of compatibility with the methacrylic resin, transparency and surface uniformity of the resulting film, the polycarbonate resin used in the present invention has an MVR of 130 to 250 $cm^3/10$ min, preferably 150 to 230 $cm^3/10$ min, and more preferably 180 to 220 $cm^3/10$ min measured under conditions of 300° C. and 1.2 Kg.

The polycarbonate resin used in the present invention has a weight average molecular weight in terms of the molecular weight of standard polystyrene determined based on a chromatogram obtained by gel permeation chromatography (GPC) preferably from 15000 to 28000, more preferably from 18000 to 27000, and further preferably from 20000 to 24000.

The MVR and the weight average molecular weight of the polycarbonate resin can be modulated by selecting the amounts of a terminal stopping agent and a branching agent.

The polycarbonate resin used in the present invention has a glass transition temperature of preferably not less than 130° C., more preferably not less than 135° C., and further preferably not less than 140° C. The upper limit to the glass transition temperature of the polycarbonate resin is usually 180° C.

The method for producing the aromatic polycarbonate resin is not particularly limited. Examples thereof include the phosgene method (the interfacial polymerization method), the melt polymerization method (the transesterification method), and the like. Alternatively, the aromatic polycarbonate resin that is preferably used in the present invention may be produced by subjecting a feed polycarbonate resin produced by the melt polymerization method to treatment for the purpose of regulating the amount of its terminal hydroxy groups.

Examples of the polyfunctional hydroxy compound as a raw material for producing the polycarbonate resin include 4,4'-dihydroxybiphenyls optionally having a substituent; bis(hydroxyphenyl)alkanes optionally having a substituent; bis(4-hydroxyphenyl)ethers optionally having a substituent; bis(4-hydroxyphenyl)sulfides optionally having a substituent; bis(4-hydroxyphenyl)sulfoxides optionally having a substituent; bis(4-hydroxyphenyl)sulfones optionally having a substituent; bis(4-hydroxyphenyl)ketones optionally having a substituent; bis(hydroxyphenyl)fluorenes optionally having a substituent; dihydroxy-p-terphenyls optionally having a substituent; dihydroxy-p-quaterphenyls optionally having a substituent; bis(hydroxyphenyl)pyrazines optionally having a substituent; bis(hydroxyphenyl)menthanes optionally having a substituent; bis[2-(4-hydroxyphenyl)-2-propyl]benzenes optionally having a substituent; dihydroxynaphthalenes optionally having a substituent; dihydroxybenzenes optionally having a substituent; polysiloxanes optionally having a substituent; dihydroperfluoroalkanes optionally having a substituent; and the like.

Among these polyfunctional hydroxy compounds, 2,2-bis(4-hydroxyphenyl)propane, 1,1-bis(4-hydroxyphenyl)cyclohexane, bis(4-hydroxyphenyl)diphenylmethane, 1,1-bis(4-hydroxyphenyl)-1-phenylethane, 2,2-bis(4-hydroxy-3-methylphenyl)propane, 2,2-bis(4-hydroxy-3-phenylphenyl)propane, 4,4'-dihydroxybiphenyl, bis(4-hydroxyphenyl)sulfone, 2,2-bis(3,5-dibromo-4-hydroxyphenyl) propane, 3,3-bis(4-hydroxyphenyl)pentane, 9,9-bis(4-hydroxy-3-methylphenyl)fluorene, bis(4-hydroxyphenyl) ether, 4,4'-dihydroxybenzophenone, 2,2-bis(4-hydroxy-3-methoxyphenyl)1,1,1,3,3,3-hexafluoropropane, $\alpha,\omega$-bis[3-(2-hydroxyphenyl)propyl]polydimethylsiloxane, resorcin, and 2,7-dihydroxynaphthalene are preferable, and 2,2-bis(4-hydroxyphenyl)propane is particularly preferable.

Examples of the carbonic-ester-formable compound include various dihalogenated carbonyls such as phosgene or the like, haloformates such as chloroformate or the like, carbonate ester compounds such as bisaryl carbonate or the like. The amount of the carbonic-ester-formable compound can be appropriately selected considering the stoichiometric ratio (equivalence) of the reaction.

The reaction is usually carried out in a solvent in the presence of an acid-binding agent. Examples of the acid-binding agent include alkali metal hydroxides such as sodium hydroxide, potassium hydroxide, lithium hydroxide, cesium hydroxide or the like, alkali metal carbonates such as sodium carbonate, potassium carbonate or the like, tertiary amines such as trimethylamine, triethylamine, tributylamine, N,N-dimethylcyclohexylamine, pyridine, dimethylaniline or the like, quaternary ammonium salts such as trimethylbenzylammonium chloride, triethylbenzylammonium chloride, tributylbenzylammonium chloride, trioctylmethylammonium chloride, tetrabutylammonium chloride, tetrabutylammonium bromide or the like, quaternary phosphonium salts such as tetrabutylphosphonium chloride, tetrabutylphosphonium bromide or the like. To the reaction system, a small amount of an antioxidant such as sodium sulfite, a hydrosulfide or the like may further be added as desired. The amount of the acid-binding agent can be appropriately selected considering the stoichiometric ratio (equivalence) of the reaction. Specifically, the acid-binding agent can be used in an amount of 1 equivalent or more, preferably 1 to 5 equivalents per 1 mol of hydroxy groups in the polyfunctional hydroxy compound as a raw material.

In the reaction, a known terminal stopping agent and/or a known branching agent can be used. Examples of the terminal stopping agent include p-tert-butyl-phenol, p-phenylphenol, p-cumylphenol, p-perfluorononylphenol, p-(perfluorononylphenyl)phenol, p-(perfluoroxylphenyl)phenol, p-tert-perfluorobutylphenol, 1-(P-hydroxybenzyl)perfluorodecane, p-[2-(1H,1H-perfluorotridodecyloxy)-1,1,1,3,3,3-hexa fluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoate, 1,1,1,3,3,3-tetrafluoro-2-propanol, and the like.

Examples of the branching agent include fluoroglycine, pyrogallol, 4,6-dimethyl-2,4,6-tris(4-hydroxyphenyl)-2-heptene, 2,6-dimethyl-2,4,6-tris (4-hydroxyphenyl)-3-heptene, 2,4-dimethyl-2,4,6-tris(4-hydroxyphenyl)heptane, 1,3,5-tris (2-hydroxyphenyl) benzene, 1,3,5-tris (4-hydroxyphenyl) benzene, 1,1,1-tris (4-hydroxyphenyl) ethane, tris(4-hydroxyphenyl)phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2,4-dihydroxyphenyl)propane, tetrakis(4-hydroxyphenyl)methane, tetrakis[4-(4-hydroxyphenylisopropyl)phenoxy]methane, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl)oxyindole, 5-chloroisatin, 5,7-dichloroisatin, 5-bromoisatin, and the like.

The polycarbonate resin may further comprise a unit having a polyester structure, a polyurethane structure, a polyether structure, or a polysiloxane structure, in addition to the polycarbonate unit.

The mass ratio of the methacrylic resin to the polycarbonate resin comprised in the methacrylic resin composition used in the present invention is from 91/9 to 99/1, more preferably from 94/6 to 98/2.

The sum total of the methacrylic resin and the polycarbonate resin comprised in the methacrylic resin composition used in the present invention is from 80 to 100% by mass, preferably from 90 to 100% by mass, more preferably from 94 to 100% by mass, and further preferably from 96 to 100% by mass.

The methacrylic resin composition used in the present invention may comprises a filler, as needed, provided that the effects of the present invention are not impaired. Examples of the filler include calcium carbonate, talc, carbon black, titanium oxide, silica, clay, barium sulfate, magnesium carbonate, and the like. The amount of the filler that can be contained in the methacrylic resin composition of the present invention is preferably not more than 3% by mass, more preferably not more than 1.5% by mass.

The methacrylic resin composition used in the present invention may comprise an additional polymer provided that the effects of the present invention are not impaired. Examples of the additional polymer include polyolefin resins such as polyethylene, polypropylene, polybutene-1, poly-4-methylpentene-1, polynorbornene or the like; ethylene ionomers; styrene resins such as polystyrene, styrene-maleic anhydride copolymers, high-impact polystyrene, AS resins, ABS resins, AES resins, AAS resins, ACS resins, MBS resins or the like; methyl methacrylate polymers, methyl methacrylate-styrene copolymers; polyester resins such as polyethylene terephthalate, polybutylene terephthalate or the like; polyamides such as nylon 6, nylon 66, polyamide elastomers or the like; polyvinyl chloride, polyvinylidene chloride, polyvinyl alcohol, ethylene-vinyl alcohol copolymers, polyacetal, polyvinylidene fluoride, polyurethane, modified polyphenylene ether, polyphenylene sulfide, modified silicone resins or the lie; acrylic rubber, acrylic thermoplastic elastomers, silicone rubber; styrene thermoplastic elastomers such as SEPS, SEBS, SIS or the like; olefin rubbers such as IR, EPR, EPDM or the like; and the like. The amount of the additional polymer that can be comprised in the methacrylic resin composition used in the present invention is preferably not more than 10% by mass, more preferably not more than 5% by mass, and most preferably 0% by mass.

The methacrylic resin composition used in the present invention may comprise an additive such as an antioxidant, a thermal degradation inhibitor, an ultraviolet absorber, a light stabilizer, a lubricant, a release agent, a polymer processing aid, an antistatic agent, a flame retardant, a dye and a pigment, a light dispersing agent, an organic coloring agent, a delustering agent, an impact resistance modifier, a fluorescent substance and the like, provided that the effects of the present invention are not impaired.

The antioxidant, by itself, has an effect to prevent oxidative degradation of a resin caused in the presence of oxygen. Examples of the antioxidant include phosphorus antioxidants, hindered phenol antioxidants, thioether antioxidants, and the like. Among these, from the viewpoint of the effect to prevent optical properties from being impaired due to discoloration, phosphorus antioxidants and hindered phenol antioxidants are preferable, and a combined use of a phosphorus antioxidant and a hindered phenol antioxidant is more preferable.

When a phosphorus antioxidant and a hindered phenol antioxidant are used in combination, the mass ratio of the phosphorus antioxidant to the hindered phenol antioxidant is preferably from 0.2/1 to 2/1, more preferably from 0.5/1 to 1/1.

As the phosphorus antioxidant, 2,2-methylenebis(4,6-di-t-butylphenyl)octyl phosphite (manufactured by ADEKA CORPORATION, trade name: ADK STAB HP-10), tris(2,4-di-tert-butylphenyl)phosphite (manufactured by BASF, trade name: IRGAFOS 168), and 3,9-bis(2,6-di-t-butyl-4-methylphenoxy)-2,4,8,10-tet raoxa-3,9-diphosphaspiro[5.5]undecane (manufactured by ADEKA CORPORATION, trade name: ADK STAB PEP-36) are preferable, for example.

As the hindered phenol antioxidant, pentaerythrityl-tetrakis[3-(3,5-di-tert-butyl-4-hydr oxyphenyl)propionate] (manufactured by BASF, trade name: IRGANOX 1010) and octadecyl-3-(3,5-di-tert-butyl-4-hydroxyphenyl)propi onate (manufactured by BASF, trade name: IRGANOX 1076) are preferable, for example.

The thermal degradation inhibitor can trap a polymer radical that is generated at high heat in the practical absence of oxygen, and as a result, the thermal degradation inhibitor can prevent thermal degradation of the resin.

As the thermal degradation inhibitor, 2-t-butyl-6-(3'-tert-butyl-5'-methyl-hydroxybenzyl)-4-methylphenyl acrylate (manufactured by Sumitomo Chemical Company, Limited, trade name: SUMILIZER GM) and 2,4-di-t-amyl-6-(3',5'-di-tert-amyl-2'-hydroxy-α-methylbenzyl)phenyl acrylate (manufactured by Sumitomo Chemical Company, Limited, trade name: SUMILIZER GS) are preferable, for example.

The ultraviolet absorber is a compound capable of absorbing ultraviolet light, and is known to have a primary function of converting light energy into thermal energy.

Examples of the ultraviolet absorber include benzophenones, benzotriazoles, triazines, benzoates, salicylates, cyanoacrylates, oxalic anilides, malonic acid esters, formamidines, and the like. Preferable among these are benzotriazoles, triazines, or ultraviolet absorbers having a maximum molar absorption coefficient, $\epsilon_{max}$, at a wavelength from 380 to 450 nm of not more than 100 $dm^3 \cdot mol^{-1}$ $cm^{-1}$.

Benzotriazoles effectively inhibit optical properties from being impaired due to, for example, discoloration caused by ultraviolet exposure, and therefore are preferably used as the ultraviolet absorber when the film of the present invention is used in optical applications. As the benzotriazoles, 2-(2H-benzotriazol-2-yl)-4-(1,1,3,3-tetramethylbutyl) phenol (manufactured by BASF, trade name: TINUVIN 329), 2-(2H-benzotriazol-2-yl)-4,6-bis(1-methyl-1-phenylethyl) phenol (manufactured by BASF, trade name: TINUVIN 234), 2,2'-methylenebis[4-t-octyl-6-(2H-benzotriazol-2-yl) phenol] (manufactured by ADEKA CORPORATION, LA-31), and 2-(5-octylthio-2H-benzotriazol-2-yl)-6-t-butyl-4-methylphenol are preferable, for example.

Ultraviolet absorbers having a maximum molar absorption coefficient $\epsilon_{max}$ at a wavelength from 380 to 450 nm of not more than 1200 $dm^3 \cdot mol^{-1}$ $cm^{-1}$ can inhibit discoloration of the resulting film. Examples of such ultraviolet absorbers include 2-ethyl-2'-ethoxy-oxalic anilide (manufactured by Clariant Japan K.K., trade name: Sanduvor VSU) and the like.

Among these ultraviolet absorbers, from the viewpoint that degradation of the resin caused by ultraviolet exposure is inhibited, benzotriazoles are preferably used.

For efficient absorption at a wavelength near 380 nm, triazine ultraviolet absorbers are preferably used. Examples of such ultraviolet absorbers include 2,4,6-tris(2-hydroxy-4-hexyloxy-3-methylphenyl)-1,3,5-triazine (manufactured by ADEKA CORPORATION, LA-F70), a hydroxyphenyl-triazine ultraviolet absorber (manufactured by BASF, TINUVIN 477 or TINUVIN 460), 2,4-diphenyl-6-(2-hydroxy-4-hexyloxyphenyl)-1,3,5-triazine, and the like.

Furthermore, for efficient absorption of light particularly of a wavelength from 380 nm to 400 nm, a metal complex that has a ligand having a heterocyclic structure disclosed in WO 2011/089794 A1, WO 2012/124395 A1, JP 2012-012476 A, JP 2013-023461 A, JP 2013-112790 A, JP 2013-194037 A, JP 2014-62228 A, JP 2014-88542 A, JP 2014-88543 A, or the like (for example, a compound having a structure represented by Formula (A)) is preferably used as the ultraviolet absorber.

[Chem. 1]

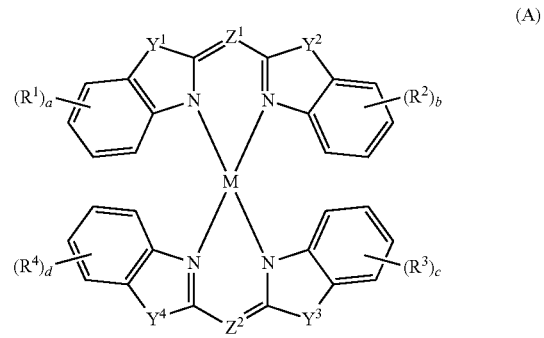

(A)

in Formula (A), M is a metal atom, each of $Y^1$, $Y^2$, $Y^3$, and $Y^4$ is independently a divalent group except for a carbon atom (examples of the divalent group include oxygen atom, sulfur atom, NH, $NR^5$ or the like), each $R^5$ is independently a substituent such as an alkyl group, an aryl group, a heteroaryl group, a heteroaralkyl group, an aralkyl group or the like, and the substituent may have an additional substituent attached thereto.

Each of $Z^1$ and $Z^2$ is independently a trivalent group such as nitrogen atom, CH, $CR^6$, or the like, each $R^6$ is independently a substituent such as an alkyl group, an aryl group, a heteroaryl group, a heteroaralkyl group, an aralkyl group or the like, and the substituent may have an additional substituent attached thereto.

Each of $R^1$, $R^2$, $R^3$, and $R^4$ is independently a substituent such as a hydrogen atom, an alkyl group, a hydroxyl group, a carboxyl group, an alkoxyl group, a halogeno group, an alkylsulfonyl group, a morpholinosulfonyl group, a piperidinosulfonyl group, a thiomorpholinosulfonyl group, a piperazinosulfonyl group or the like, the substituent may have an additional substituent attached thereto, and each of a, b, c and d indicates the number of $R^1$, $R^2$, $R^3$, or $R^4$, respectively, and is an integer of 1 to 4.

Examples of the ligand having the heterocyclic structure include 2,2'-iminobisbenzothiazole, 2-(2-benzothiazolylamino)benzoxazole, 2-(2-benzothiazolylamino)benzimidazole, (2-benzothiazolyl) (2-benzoimidazolyl)methane, bis (2-benzoxazolyl)methane, bis(2-benzothiazolyl)methane, bis[2-(N-substituted)benzoimidazolyl]methane, and the like, and derivatives thereof. The central metal of the metal complex is preferably copper, nickel, cobalt, or zinc. To use the metal complex as the ultraviolet absorber, the metal complex is preferably dispersed in a medium such as a low-molecular weight compound or a polymer. The amount of the metal complex is preferably from 0.01 part by mass to 5 parts by mass and more preferably from 0.1 to 2 parts by mass relative to 100 parts by mass of the film of the present invention. Having a high molar absorption coefficient at a wavelength from 380 nm to 400 nm, the metal complex can be added in a small amount for adequate ultraviolet absorption. When the amount is small, deterioration in the appearance of a formed article caused by bleed-out or the like can be inhibited. The metal complex also has excellent heat resistance and therefore is less likely to deteriorate or decompose during forming and processing. Furthermore, with its high light resistance, the metal complex can maintain its ultraviolet absorbing performance for an extended period of time.

The maximum molar absorption coefficient $\epsilon_{max}$ of the ultraviolet absorber is measured as follows. To 1 L of cyclohexane, 10.00 mg of the ultraviolet absorber is added and dissolved until no undissolved matter is visually observed. The resulting solution is poured into a quartz glass cell of 1 cm×1 cm×3 cm and the absorbance at a wavelength from 380 to 450 nm for an optical path length of 1 cm is measured with a U-3410 spectrophotometer manufactured by Hitachi, Ltd. Using the molecular weight ($M_{UV}$) of the ultraviolet absorber and the maximum absorbance ($A_{max}$) thus measured, the maximum molar absorption coefficient $\epsilon_{max}$ is calculated by the following formula.

$$\epsilon_{max}=[A_{max}/(10\times10^{-3})]\times M_{UV}$$

The light stabilizer is a compound that is known to have a primary function of trapping a radical generated by light oxidation. Preferable examples of the light stabilizer include hindered amines such as compounds having a 2,2,6,6-tetraalkylpiperidine skeleton, and the like.

Examples of the lubricant include stearic acid, behenic acid, stearamide, methylenebisstearamide, triglyceride hydroxystearate, paraffin wax, ketone wax, octyl alcohol, hydrogenated oil, and the like.

The release agent is a compound that has a function of facilitating release of a formed article from a mold. Examples of the release agent include higher alcohols such as cetyl alcohol, stearyl alcohol or the like; glycerol higher fatty acid esters such as stearic acid monoglyceride, stearic acid diglyceride, and the like. As the release agent in the present invention, a higher alcohol and a glycerol fatty acid monoester are preferably used in combination. When a higher alcohol and a glycerol fatty acid monoester are used in combination, the mass ratio of the higher alcohol to the glycerol fatty acid monoester is preferably in the range of 2.5/1 to 3.5/1, more preferably in the range of 2.8/1 to 3.2/1.

The polymer processing aid is usually a polymer particle with a particle diameter of 0.05 to 0.5 μm that can be produced by the emulsion polymerization method. The polymer particle may be a monolayer particle composed of a polymer having a single composition ratio and a single limiting viscosity, or may be a multilayer particle composed of two or more polymers having different composition ratios or different limiting viscosities. Among these, preferable examples thereof include, for example, particles having a two-layer structure where the inner layer is a polymer layer with a relatively low limiting viscosity and the outer layer is a polymer layer with a relatively high limiting viscosity of not less than 5 dl/g. The limiting viscosity of the polymer processing aid is preferably from 3 to 6 dl/g.

Examples of the impact resistance modifier include core-shell modifiers comprising an acrylic rubber or diene rubber as a core layer component; modifiers containing a plurality of rubber particles, and the like.

As the organic coloring agent, preferably employed is a compound that has a function of converting ultraviolet light, which is thought to be harmful to a resin, into visible light.

Examples of the light dispersing agent and the delustering agent include glass microparticles, polysiloxane crosslinked microparticles, crosslinked polymer microparticles, talc, calcium carbonate, barium sulfate, and the like.

Examples of the fluorescent substance include fluorescent pigments, fluorescent dyes, fluorescent white dyes, fluorescent brighteners, fluorescent bleaching agents, and the like.

These additives may be used alone or as a combination of two or more. These additives may be added to a polymerization solution during production of the methacrylic resin or the polycarbonate resin, or may be added to the methacrylic resin or the polycarbonate resin produced, or may be added during preparation of the methacrylic resin composition. From the viewpoint of inhibiting defective appearance of the film, the total sum of the additives contained in the methacrylic resin composition used in the present invention is preferably not more than 7% by mass, more preferably not more than 5% by mass, and further preferably not more than 4% by mass relative to the amount of the methacrylic resin.

The method for preparing the methacrylic resin composition is not particularly limited. Examples thereof include a method comprising subjecting a monomer mixture containing methyl methacrylate to polymerization in the presence of the polycarbonate resin to produce the methacrylic resin, a method comprising melt kneading the methacrylic resin and the polycarbonate resin, and the like. Among these, the melt kneading method is preferable for its simple procedure. The additional polymer and the additives may be mixed during melt kneading, as needed. Alternatively, the methacrylic resin may be first mixed with the additional polymer and the additives and then mixed with the polycarbonate resin. Further alternatively, the polycarbonate resin may be first mixed with the additional polymer and the additives and then mixed with the methacrylic resin. Kneading can be performed using a known mixing apparatus or a known kneading apparatus, such as a kneader ruder, an extruder, a mixing roll, a Banbury mixer or the like. Among these, a twin screw extruder is preferable. The temperature during mixing and kneading can be appropriately regulated depending on, for example, the melting temperatures of the methacrylic resin and the polycarbonate resin used, and is preferably from 110° C. to 300° C. The methacrylic resin composition thus prepared can be formed into any form such as pellet, granule, or powder before film formation.

The methacrylic resin composition used in the present invention has a glass transition temperature of preferably not less than 120° C., more preferably not less than 123° C., and further preferably not less than 124° C. The upper limit to the glass transition temperature of the methacrylic resin composition is not particularly limited but is preferably 130° C.

The methacrylic resin composition used in the present invention has an Mw of preferably 70000 to 200000, more preferably 72000 to 160000, and further preferably 75000 to 120000 as determined by GPC. The methacrylic resin composition used in the present invention has a molecular weight distribution of preferably 1.2 to 2.5 and more preferably 1.3 to 2.0 as determined by GPC. When the Mw and the molecular weight distribution are within these ranges, the methacrylic resin composition has excellent forming processability, and a formed article having excellent impact resistance and excellent toughness tends to be obtained.

The methacrylic resin composition used in the present invention has a melt flow rate of preferably 0.1 to 6 g/10 min, further preferably 0.5 to 5 g/10 min, and most preferably 1.0 to 3 g/10 min as measured under conditions of 230° C. and 3.8 kg load.

The methacrylic resin composition used in the present invention, when the thickness is 3.2 mm, has a haze of preferably not more than 3.0%, more preferably not more than 2.0%, and further preferably not more than 1.5%.

The film of the present invention is not particularly limited in its production process. The film of the present invention can be obtained, for example, by subjecting the methacrylic resin composition to film-forming by a known method such as the solution casting method, the melt-flow casting method, the extrusion method, the inflation forming method, the blow molding method or the like. Among these, the extrusion method is preferable. The extrusion method can give a film having excellent transparency, enhanced toughness, excellent ease of handling, and an excellent balance among toughness, surface hardness, and rigidity. The temperature of the methacrylic resin composition when being discharged from the extruder is set at preferably 160 to 270° C., more preferably 220 to 260° C.

From the viewpoint of obtaining a film having a good surface smoothness, excellent specular gloss, and a low haze level, the extrusion method is preferably carried out by extruding the methacrylic resin composition in a molten state through a T-die, and then holding the resultant between two or more mirrored rolls or mirrored belts for forming. The mirrored rolls or the mirrored belts are preferably made of metal. The linear pressure between a pair of the rolls or belts is preferably not less than 10 N/mm, more preferably not less than 30 N/mm.

The surface temperature of either the mirrored rolls or the mirrored belts is preferably not more than 130° C. It is preferable that at least one of the paired mirrored rolls or at least one of the paired mirrored belts has a surface temperature of not less than 60° C. With the surface temperature being thus adjusted, the methacrylic resin composition when being discharged from the extruder can be cooled faster than when being simply left to cool, thereby allowing the film of the present invention having a good surface smoothness and a low haze to be readily produced.

The film of the present invention may be subjected to stretching treatment. The stretching treatment can increase mechanical strength and give a film that does not easily crack. The stretching method is not particularly limited, and examples thereof include uniaxial stretching, simultaneous biaxial stretching, sequential biaxial stretching, tubular stretching, and the like. The stretching temperature is preferably from 100 to 200° C. and more preferably from 120° C. to 160° C. from the viewpoints of uniform stretching and excellent strength of the resulting film. Stretching is usually performed at 100 to 5000%/min in terms of length. After stretching, heat setting can be performed so as to give a film having a low level of heat shrinkage.

The film of the present invention comprises the methacrylic resin in an amount of preferably 73 to 99% by mass, more preferably 80 to 97% by mass, and further preferably 85 to 95% by mass from the viewpoints of transparency and small retardation in the thickness direction.

The film of the present invention comprises the polycarbonate resin in an amount of preferably 1 to 9% by mass, more preferably 2 to 7% by mass, and further preferably 3 to 6% by mass from the viewpoint of small retardation in the thickness direction.

The film of the present invention is not particularly limited in its thickness, but when used as an optical film, the thickness is preferably from 1 to 300 μm, more preferably from 10 to 50 μm, and further preferably from 15 to 40 μm.

The film of the present invention, when the thickness is 50 μm, has a haze of preferably not more than 0.2%, more preferably not more than 0.1%. This range of haze achieves excellent surface gloss and excellent transparency. In addition, this range of haze is preferable because it increases utilization efficiency of light from light sources in optical applications such as protective films for liquid crystal and light guide films. Furthermore, this range of haze is preferable because it achieves excellent shaping precision in surface shaping.

The in-plane direction retardation Re of the film of the present invention to light having a wavelength of 590 nm is preferably not more than 5 nm, more preferably not more than 4 nm, further preferably not more than 3 nm, particularly preferably not more than 2 nm and most preferably not more than 1 nm when the thickness of the film is 40 μm.

The thickness direction retardation Rth of the film of the present invention to light having a wavelength of 590 nm is preferably not less than −5 nm and not more than 5 nm, more preferably not less than −4 nm and not more than 4 nm, further preferably not less than −3 nm and not more than 3 nm, particularly preferably not less than −2 nm and not more than 2 nm, and most preferably not less than −1 nm and not more than 1 nm when the thickness of the film is 40 μm.

With the in-plane direction retardation and the thickness direction retardation being within these ranges, influences of retardation on the display properties of an image display are remarkably inhibited. More specifically, irregularity due to interference can be remarkably inhibited, and in applications of 3D liquid crystal displays, distortion of 3D images can also be remarkably inhibited.

The in-plane direction retardation Re and the thickness direction retardation Rth are defined by the following formulae, respectively.

$$Re=(nx-ny)\times d$$

$$Rth=((nx+ny)/2-nz)\times d$$

in which nx denotes the refractive index of the film in the slow-axis direction, ny denotes the refractive index of the film in the fast-axis direction, nz denotes the refractive index of the film in the thickness direction, and d (nm) denotes the thickness of the film. The slow-axis direction is the direction toward which the refractive index is maximum in the plane of the film, and the fast axis direction is the direction perpendicular to the slow axis direction in the plane.

The film of the present invention has excellent transparency, excellent heat resistance, small retardation, and a small thickness, and therefore is suitable in such applications as protective films for polarizers, protective plates for liquid crystal, surface materials for mobile information terminal, protective films for display windows of mobile information terminal, light guide films, transparent conductive films having silver nanowire or carbon nanotube coating surface, front plates of various displays, and the like. With the small retardation, the film of the present invention is particularly suitable as a polarizer protective film.

The film of the present invention has excellent transparency and excellent heat resistance, and therefore can be used in, besides optical applications, IR-cut films, security films, shatter-proof films, decorative films, metal-decorative films, back sheets for solar cells, front sheets for flexible solar cells, shrink films, in-mold label films, and the like.

The polarizing plate of the present invention comprises at least one polarizer protective film of the present invention. Preferably, a polarizer made of a polyvinyl alcohol resin is overlaid with the polarizer protective film of the present invention, with an adhesive-agent layer interposed therebetween.

As shown in FIG. 1, the polarizing plate according to a preferable embodiment of the present invention comprises a polarizer 11, and an adhesive-agent layer 12, an adhesiveness enhancing layer 13 and the polarizer protective film of the present invention 14 stacked in this order on one side of the polarizer 11, and an adhesive-agent layer 15 and an optical film 16 stacked in this order on another side of the polarizer 11.

The polarizer made of a polyvinyl alcohol resin is obtained, for example, by dyeing a polyvinyl alcohol resin film with a dichroic substance (typically iodine or a dichroic dye) and performing uniaxial stretching. The polyvinyl alcohol resin film can be obtained by subjecting a polyvinyl alcohol resin to film-forming by any suitable method such as flow casting method comprising subjecting a solution containing a resin dissolved in water or an organic solvent to flow casting and film forming, casting method, extrusion method, for example. The polyvinyl alcohol resin has a degree of polymerization preferably from 100 to 5000, further preferably from 1400 to 4000. The thickness of the polyvinyl alcohol resin film used in the polarizer can be selected appropriately depending on the purpose of use and the intended applications of an LCD to be produced using the polarizing plate, and is typically from 5 to 80 μm.

As the method of producing the polarizer, any suitable method can be employed depending on, for example, the purpose of use, the materials, and the conditions of use. A typical method comprises subjecting the polyvinyl alcohol resin film to a series of steps of swelling, dyeing, crosslinking, stretching, water washing, and drying. In each of the steps except for the drying step, the procedure is performed with the polyvinyl alcohol resin film being immersed in a bath containing a solution used in the step. As for each of the procedures of swelling, dyeing, crosslinking, stretching, water washing, and drying, the order, the number of repetition, and whether the procedure is performed can be determined as needed depending on, for example, the purpose of use, the materials, and the conditions of use. For example, multiple procedures may be performed simultaneously in a single step, or a certain procedure may be omitted. More specifically, the stretching procedure, for example, may be performed after the dyeing procedure, may be performed before the dyeing procedure, or may be performed simultaneously with the swelling procedure, the dyeing procedure, and the crosslinking procedure. Preferably, for example, the crosslinking procedure can be performed before and after the stretching procedure. For example, the water washing procedure may be performed after every other procedure, or may be performed only after a certain procedure.

The swelling step is typically performed by immersing the polyvinyl alcohol resin film in a treatment bath (a bath for swelling) filled with water. By this procedure, stains and an anti-blocking agent are washed away from the surface of the polyvinyl alcohol resin film, and at the same time, nonuniform dyeing and other irregularities can be prevented because the polyvinyl alcohol resin film becomes swollen. To the bath for swelling, glycerol and/or potassium iodide, for example, can be added appropriately. The temperature of the bath for swelling is typically from about 20° C. to about 60° C. The duration of immersion in the bath for swelling is typically from about 0.1 minute to about 10 minutes.

The dyeing step is typically performed by immersing the polyvinyl alcohol resin film in a treatment bath (a bath for dyeing) containing a dichroic substance such as iodine and the like. The solvent contained in the solution that fills the bath for dyeing is generally water, optionally containing a proper amount of an organic solvent compatible with water. The dichroic substance is typically used in a proportion from 0.1 to 1.0 part by weight relative to 100 parts by weight of the solvent. When iodine is used as the dichroic substance, it is preferable that the solution that fills the bath for dyeing further contains an aid such as an iodide or the like, for enhancing the efficiency of dyeing. The aid is used in a proportion preferably from 0.02 to 20 parts by weight and further preferably from 2 to 10 parts by weight relative to 100 parts by weight of the solvent. Specific examples of the iodide include potassium iodide, lithium iodide, sodium iodide, zinc iodide, aluminum iodide, lead iodide, copper iodide, barium iodide, calcium iodide, tin iodide, titanium iodide, and the like. The temperature of the bath for dyeing is typically from about 20° C. to about 70° C. The duration of immersion in the bath for dyeing is typically from about 1 minute to about 20 minutes.

The crosslinking step is typically performed by immersing the polyvinyl alcohol resin film that has undergone the dyeing procedure in a treatment bath (a bath for crosslinking) containing a crosslinking agent. As the crosslinking agent, any suitable crosslinking agent can be employed. Specific examples of the crosslinking agent include boric acid, a boron compound such as borax or the like, glyoxal, glutaraldehyde, and the like. These can be used alone or as a combination. The solvent contained in the solution that fills the bath for crosslinking is generally water, optionally containing a proper amount of an organic solvent compatible with water. The crosslinking agent is typically used in a proportion from 1 to 10 parts by weight relative to 100 parts by weight of the solvent. When the concentration of the crosslinking agent is less than 1 part by weight, adequate optical properties cannot be obtained in most cases. When the concentration of the crosslinking agent exceeds 10 parts by weight, great stretching force is generated in the film at the time of stretching, and the resulting polarizing plate sometimes may shrink. It is preferable that the solution that fills the bath for crosslinking further contains an aid such as an iodide or the like so that uniform properties across the film tend to be obtained. The concentration of the aid is preferably from 0.05 to 15% by weight, further preferably from 0.5 to 8.0% by weight. Specific examples of the iodide are the same as those in the dyeing step. The temperature of the bath for crosslinking is typically from about 20° C. to about 70° C., preferably from 40° C. to 60° C. The duration of immersion in the bath for crosslinking is typically from about 1 second to about 15 minutes, preferably from 5 seconds to 10 minutes.

As described above, the stretching step may be performed at any stage. Specifically, the stretching step may be performed after the dyeing procedure, may be performed before the dyeing procedure, may be performed simultaneously with the swelling procedure, the dyeing procedure, and the crosslinking procedure, or may be performed after the crosslinking procedure. The cumulative stretch ratio of the polyvinyl alcohol resin film needs to be not less than 5, and is preferably from 5 to 7, further preferably from 5 to 6.5. When the cumulative stretch ratio is less than 5, a polarizing plate having a high degree of polarization is sometimes difficult to be obtained. When the cumulative stretch ratio exceeds 7, the polyvinyl alcohol resin film (polarizer) may easily break. As the specific method of stretching, any suitable method can be employed. When the wet stretching method is employed, for example, the polyvinyl alcohol resin film is stretched in a treatment bath (a bath for stretching) by a predetermined ratio. As the solution that fills the bath for stretching, a solution containing various metal salts, an iodine compound, a boron compound, or a zinc compound in a solvent such as water or an organic solvent (ethanol, for example) is preferably used.

The water washing step is typically performed by immersing the polyvinyl alcohol resin film that has undergone the procedures described above in a treatment bath (a bath for water washing). By the water washing step, unwanted matter remaining on the polyvinyl alcohol resin film can be washed away. The bath for water washing may be filled with deionized water or may be filled with an aqueous solution of an iodide (potassium iodide or sodium iodide, for example). The concentration of the aqueous iodide solution is preferably from 0.1 to 10% by mass. To the aqueous iodide solution, an aid such as zinc sulfate, zinc chloride or the like may be added. The temperature of the bath for water washing is preferably from 10 to 60° C., further preferably from 30 to 40° C. The duration of immersion is typically from 1 second to 1 minute. The water washing step may be performed only once, or may be repeated multiple times if needed. When the water washing step is repeated multiple times, the types and the concentrations of additives contained in the bath for water washing in each procedure can be selected appropriately. For example, the water washing step comprises a step of immersing the polymer film in an aqueous solution of potassium iodide (0.1 to 10% by mass, 10 to 60° C.) for 1 second to 1 minute and a step of rinsing with deionized water.

As the drying step, any suitable drying method (natural drying, air-blow drying, heat drying, for example) can be employed. In the case of heat drying, for example, the temperature during drying is typically from 20 to 80° C., and the duration of drying is typically from 1 to 10 minutes. As a result, the polarizer is obtained.

The adhesive-agent layer that can be comprised in the polarizing plate of the present invention is not particularly limited provided that it is optically transparent. As an adhesive agent that constitutes the adhesive-agent layer, an aqueous adhesive agent, a solvent adhesive agent, a hot-melt adhesive agent, a UV-curing adhesive agent or the like can be used, for example. Among these, the aqueous adhesive agent and the UV-curing adhesive agent are preferably used.

The aqueous adhesive agent is not particularly limited, and examples thereof can include vinyl polymer adhesive agents, gelatin adhesive agents, vinyl latex adhesive agents, polyurethane adhesive agents, isocyanate adhesive agents, polyester adhesive agents, epoxy adhesive agents, and the like. To the aqueous adhesive agent, a crosslinking agent, other additives, a catalyst such as an acid, and the like can be added if needed. As the aqueous adhesive agent, a vinyl polymer-containing adhesive agent or the like is preferably used, and the vinyl polymer is preferably a polyvinyl alcohol resin. The polyvinyl alcohol resin can contain a water-soluble crosslinking agent such as boric acid, borax, glutaraldehyde, melamine, oxalic acid, or the like. In particular, when a polyvinyl-alcohol polymer film is used for the polarizer, an adhesive agent comprising a polyvinyl alcohol resin is preferably used in terms of adhesion properties. In terms of enhancing durability, an adhesive agent comprising a polyvinyl alcohol resin having an acetoacetyl group is further preferable. The aqueous adhesive agent is usually used in the form of an aqueous-solution, and usually has a solid content of 0.5 to 60% by weight.

The adhesive agent can contain a metal compound filler. The metal compound filler can modulate the fluidity of the adhesive-agent coating film to make the thickness uniform, resulting in polarizing plate having excellent appearance, no variations in adhesion properties and uniform surface.

The method for forming the adhesive-agent layer is not particularly limited. For example, the adhesive agent can be applied onto a target item and then heated or dried to form the adhesive-agent layer. The applying of the adhesive agent may be carried out on the polarizer protective film or the optical film of the present invention, or on the polarizer. After the adhesive-agent layer is formed, the polarizer protective film or the optical film can be pressed against the polarizer to give a laminate. Lamination can be performed with a roll press apparatus or a plate press apparatus, for example. The temperature during heating and drying and the duration of drying are appropriately determined depending on the type of the adhesive agent.

The dried thickness of the adhesive-agent layer is preferably from 0.01 to 10 µm, further preferably from 0.03 to 5 µm.

The adhesiveness enhancing layer that can be comprised in the polarizing plate of the present invention enhances adhesion between the polarizer protective film and the polarizer. The adhesiveness enhancing layer can be provided by adhesiveness enhancing treatment, for example. Examples of the adhesiveness enhancing treatment include surface treatments such as corona treatment, plasma treatment, low-pressure UV treatment, and the like. The adhesiveness enhancing layer can also be provided by performing a method of forming an anchor layer, or a combination of the surface treatment described above with the method of forming an anchor layer. Among these, corona treatment, the method of forming an anchor layer, and a combination thereof are preferable.

Examples of the anchor layer include a silicone layer having a reactive functional group, and the like. The material for the silicone layer having a reactive functional group is not particularly limited, and examples thereof include alkoxysilanols having an isocyanate group, alkoxysilanols having an amino group, alkoxysilanols having a mercapto group, alkoxysilanols having a carboxy group, alkoxysilanols having an epoxy group, alkoxysilanols having an unsaturated vinyl group, alkoxysilanols having a halogeno group, alkoxysilanols having an isocyanate group, and the like. Among these, aminosilanols are preferable. Adding a titanium catalyst or a tin catalyst for efficient silanol reaction to the silanol, adhesion force can be enhanced. Other additives may also be added to the silicone having a reactive functional group. Examples of the other additives include a tackifier such as terpene resins, phenolic resins, terpene-phenol resins, rosin resins, xylene resins or the like; a stabilizer such as an ultraviolet absorber, an antioxidant, a heat stabilizer; and the like. Examples of the anchor layer include a layer comprising a saponified cellulose acetate butyrate resin, and the like.

The anchor layer is formed by coating and drying in known techniques. The dried thickness of the anchor layer is preferably from 1 to 100 nm, further preferably from 10 to 50 nm. Before coating, a chemical solution for anchor layer formation may be diluted with a solvent. The solvent for dilution is not particularly limited, and examples thereof include alcohols and the like. The degree of dilution is not particularly limited, but is preferably from 1 to 5% by weight, more preferably from 1 to 3% by weight.

The optical film 16 may be the polarizer protective film of the present invention or may be any other suitable optical film. The optical film used is not particularly limited, and examples thereof include films made of a cellulose resin, a polycarbonate resin, a cyclic polyolefin resin, a methacrylic resin, or the like.

The cellulose resin is a cellulose ester of a fatty acid. Specific examples of the cellulose ester resin include cellulose triacetate, cellulose diacetate, cellulose tripropionate, cellulose dipropionate, and the like. Among these, cellulose triacetate is particularly preferable. Cellulose triacetate is commercially available as many products, and is therefore advantageous in terms of availability and cost. Examples of the commercially available cellulose triacetate products include products manufactured by Fujifilm Corporation under the trade names of "UV-50", "UV-80", "SH-80", "TD-80U", "TD-TAC", "UZ-TAC" and the like, products of "KC Series" manufactured by Konica Minolta, Inc., and the like.

The cyclic polyolefin resin collectively refers to resins obtained by polymerization of cyclic olefin monomer units. Examples thereof include resins described in JP H01-240517 A, JP H03-14882 A, JP H03-122137 A, and the like. Specific examples thereof include ring-opening (co)polymers of cyclic olefin, addition polymers of cyclic olefin, copolymers (typically, random copolymers) of cyclic olefin and α-olefin such as ethylene and propylene, graft polymers modified with an unsaturated carboxylic acid or a derivative thereof, hydrogenated products of these, and the like. Specific examples of the cyclic olefin include norbornene monomers and the like.

The cyclic polyolefin resin is commercially available as various products. Specific examples thereof include products manufactured by Zeon Corporation under the trade names of "Zeonex" and "Zeonor", products manufactured by JSR Corporation under the trade name of "Arton", products manufactured by Polyplastics Co., Ltd. under the trade name of "Topas", products manufactured by Mitsui Chemicals, Inc. under the trade name of "APEL", and the like.

As the methacrylic resin, any suitable methacrylic resin can be used provided that the effects of the present invention are not impaired. Examples thereof include polymethacrylic acid esters such as polymethyl methacrylate, methyl methacrylate-(meth)acrylic acid copolymers, methyl methacrylate-(meth)acrylic acid ester copolymers, methyl methacrylate-acrylic acid ester-(meth)acrylic acid copolymers, methyl (meth)acrylate-styrene copolymers (MS resins, or the like), polymers having an alicyclic hydrocarbon group (methyl methacrylate-cyclohexyl methacrylate copolymers, methyl methacrylate-norbornyl (meth)acrylate copolymers, or the like), and the like.

Specific examples of the methacrylic resin include Acrypet VH and Acrypet VRL20A manufactured by Mitsubishi Rayon Co., Ltd., acrylic resins obtained by copolymerization of methyl methacrylate and a maleimide monomer as described in JP 2013-033237 A and WO 2013/005634, acrylic resins having a ring structure in the molecule as described in WO 2005/108438, methacrylic resins having a ring structure in the molecule as described in JP 2009-197151 A, methacrylic resins having a high glass transition temperature (Tg) obtained by intramolecular crosslinking or intramolecular cyclization reaction, and the like.

As the methacrylic resin, a methacrylic resin having a lactone ring structure may also be used, for excellent heat resistance and excellent transparency as well as excellent mechanical strength given by biaxial stretching.

Examples of the methacrylic resin having a lactone ring structure include methacrylic resins having a lactone ring structure as described in JP 2000-230016 A, JP 2001-151814 A, JP 2002-120326 A, JP 2002-254544 A, JP 2005-146084 A, and the like.

The polarizing plate of the present invention can be used in an image display. Specific examples of the image display include self-luminescent displays such as electroluminescent (EL) displays, plasma displays (PD), field emission displays (FED) or the like, and liquid crystal displays. The liquid crystal displays have a liquid crystal cell and the polarizing plate disposed on at least one side of the liquid crystal cell.

EXAMPLES

The present invention is described more specifically by examples and comparative examples. The present invention is, however, not limited to these examples. Measurement of physical properties and the like are carried out by the following methods.

(Polymerization Conversion Ratio)

To a gas chromatograph GC-14A manufactured by Shimadzu Corporation, a column Inert CAP 1 (df=0.4 m, 0.25 mm I.D.×60 m) manufactured by GL Sciences Inc. was attached. Measurement was performed under conditions where the injection temperature was 180° C., the detector temperature was 180° C., and the column temperature was raised from 60° C. (maintained for 5 minutes) to reach 200° C. at a temperature raising rate of 10° C./min and maintained at 200° C. for 10 minutes. Based on the results, the polymerization conversion ratio was determined by calculation.

(Weight Average Molecular Weight (Mw), Molecular Weight Distribution, Contents of Components Having High Molecular Weights and Components Having Low Molecular Weights)

The Mw and the molecular weight distribution of a methacrylic resin obtained in each Production Example, each Example, and each Comparative Example were calculated in terms of the molecular weight of standard polystyrene, from a chromatogram measured by gel permeation chromatography (GPC) under the following conditions. The base line was defined as a line that was drawn by connecting the point where the slope on the higher-molecular-weight side peak in the GPC chart changed from zero to positive when viewed from the side of earlier retention time, with the point where the slope on the lower-molecular-weight side peak in the GPC chart changed from negative to zero when viewed from the side of earlier retention time. A calibration curve was used to calculate an integral molecular weight distribution, which was then used to calculate the proportion of components having molecular weights less than 15000 (low molecular weight component) and the proportion of components having molecular weights not less than 200000 (high molecular weight component).

GPC device: HLC-8320 manufactured by Tosoh Corporation

Detector: Differential refractometer

Column: Two TSKgel SuperMultipore HZM-M columns and a Super HZ4000 column manufactured by Tosoh Corporation, connected in series Eluting agent: Tetrahydrofuran Flow rate of eluting agent: 0.35 ml/min Column temperature: 40° C.

Calibration curve: Drawn by connecting 10 data points plotted for standard polystyrene (Triad Syndiotacticity (rr))

A $^1$H-NMR spectrum of a methacrylic resin was measured on a nuclear magnetic resonance spectrometer (manufactured by Bruker, ULTRA SHIELD 400 PLUS), with deuterated chloroform used as a solvent, under conditions at room temperature and 64 times of repetition. The resulting spectrum was used to determine the area (X) of the 0.6-0.95-ppm region and the area (Y) of the 0.6-1.35-ppm region with the spectrum of TMS being taken as 0 ppm, followed by calculation of the triad syndiotacticity (rr) by a formula: (X/Y)×100.

(Glass Transition Temperature Tg)

With a differential scanning calorimeter (manufactured by Shimadzu Corporation, DSC-50 (product number)) and according to JIS K7121, a DSC curve was measured under conditions where the temperature of a methacrylic resin, a polycarbonate resin, or a methacrylic resin composition was raised to reach 230° C., cooled to room temperature, and raised again from room temperature to 230° C. at 10° C./min. From the DSC curve that was obtained while the temperature was being raised the second time, the midpoint glass transition temperature was determined, for use as the glass transition temperature in the present invention.

(Melt Mass-Flow Rate (MFR))

A methacrylic resin used as a raw material of a methacrylic resin composition, which was to be used in production of a film in each Example and each Comparative Example, was subjected to measurement according to JIS K7210 under conditions of 230° C., 3.8 kg load, and 10 minutes.

(Melt Volume-Flow Rate (MVR))

A polycarbonate resin used as a raw material of a methacrylic resin composition, which was to be used in production of a film in each Example and each Comparative Example, was subjected to measurement according to JIS K7210 under conditions of 300° C., 1.2 kg load, and 10 minutes.

(Surface Smoothness)

The surface of a non-stretched film obtained in each Example and each Comparative Example was visually observed, and evaluated for surface smoothness based on the following criteria.

A: smooth surface

B: rough surface (Heat Shrinkage Ratio)

From a uniaxially stretched film obtained in each Example and each Comparative Example, a test piece was cut out and marked with a 70-mm-long straight line on the surface. After heated for 30 minutes in a hot-air forced circulation thermostatic oven maintained at a temperature of 110° C., the length of the straight line (L (mm)) was read on a scale, and the heat shrinkage ratio was determined by the following formula.

Heat shrinkage ratio (%)=(70−L)/70×100

(Total Light Transmittance)

From a uniaxially stretched film or a biaxially stretched film obtained in each Example and each Comparative Example, a test piece was cut out. The total light transmittance thereof was measured according to JIS K7361-1 with a haze meter (manufactured by Murakami Color Research Laboratory, HM-150). As for evaluation of the total light transmittance of a methacrylic resin composition, heat pressing was performed to give a formed article having a thickness of 3.2 mm, and the total light transmittance thereof was measured.

(Haze)

From a uniaxially stretched film or a biaxially stretched film obtained in each Example and each Comparative Example, a test piece was cut out. The haze thereof was measured according to JIS K7136 with a haze meter (manufactured by Murakami Color Research Laboratory, HM-150). As for evaluation of the haze of a methacrylic resin composition, heat pressing was performed to give a formed article having a thickness of 3.2 mm, and the haze thereof was measured.

(Retardation in Film Thickness Direction (Rth))

From a uniaxially stretched film or a biaxially stretched film obtained in each Example and each Comparative Example, a test piece of 40 mm×40 mm was cut out. The test piece was subjected to measurement on an automatic birefringence analyzer (manufactured by Oji Scientific Instruments, KOBRA-WR). From retardation measured at a temperature of 23±2° C., a humidity of 50±5%, a wavelength of 590 nm, and an inclination of 40°, the three-dimensional refractive index values, namely, nx, ny, and nz were determined. Then, the retardation in the thickness direction was determined by calculation: $Rth=((nx+ny)/2-nz)\times d$. The thickness, d, (nm) of the test piece was measured on a Digimatic Indicator (manufactured by Mitutoyo Corporation), and the refractive index, n, was measured on a digital precision refractometer (Kalnew Optics Industries, KPR-20).

(Retardation in In-Plane Direction (Re))

From a biaxially stretched film obtained in each Example and each Comparative Example, a test piece of 40 mm×40 mm was cut out. The test piece was subjected to measurement on an automatic birefringence analyzer (manufactured by Oji Scientific Instruments, KOBRA-WR) at a temperature of 23±2° C. and a humidity of 50±5% to determine the retardation in the in-plane direction, Re.

(Stretching Properties)

By biaxially stretching a non-stretched film obtained in each Example and each Comparative Example, stretching properties were evaluated based on the following criteria.

A: Not less than 5 samples out of 10 samples gave a film free of breaks or cracks.

B: Not more than 4 samples out of 10 samples gave a film free of breaks or cracks.

Production Example 1

A 5-L glass reaction vessel equipped with a stirring blade and a three-way cock, after the interior being replaced with nitrogen, was fed at room temperature with 1600 g of toluene, 2.49 g (10.8 mmol) of 1,1,4,7,10,10-hexamethyltriethylenetetramine, 53.5 g (30.9 mmol) of a 0.45-M solution of isobutylbis(2,6-di-t-butyl-4-methylphenoxy)aluminum in toluene, and 6.17 g (10.3 mmol) of a 1.3-M sec-butyllithium solution (solvent: 95% by mass of cyclohexane and 5% by mass of n-hexane). Thereto with stirring at −20° C., 550 g of methy methacrylate purified by distillation was added dropwise over 30 minutes. After the completion of dropwise addition, stirring was performed at −20° C. for another 180 minutes. The color of the solution turned from yellow to colorless, at which point the conversion ratio of methyl methacrylate was 100%.

To the resulting solution, 1500 g of toluene was added for dilution. The diluted solution was then poured in 100 kg of methanol, and a precipitate was obtained. The resulting precipitate was dried at 80° C. and 140 Pa for 24 hours, and a methacrylic resin [PMMA1] having an Mw of 96100, a molecular weight distribution of 1.07, a syndiotacticity (rr) of 83%, a glass transition temperature of 133° C., and a proportion of structural unit derived from methyl methacrylate of 100% by mass was obtained.

Production Example 2

A 5-L glass reaction vessel equipped with a stirring blade and a three-way cock, after the interior being replaced with nitrogen, was fed at room temperature with 1600 g of toluene, 2.49 g (10.8 mmol) of 1,1,4,7,10,10-hexamethyltriethylenetetramine, 53.5 g (30.9 mmol) of a 0.45-M solution of isobutylbis(2,6-di-t-butyl-4-methylphenoxy)aluminum in toluene, and 6.17 g (10.3 mmol) of a 1.3-M sec-butyllithium solution (solvent: 95% of cyclohexane and 5% of n-hexane). Thereto with stirring at 20° C., 550 g of methyl methacrylate purified by distillation was added dropwise over 30 minutes. After the completion of dropwise addition, stirring was performed at 20° C. for another 90 minutes. The color of the solution turned from yellow to colorless, at which point the polymerization conversion ratio of methyl methacrylate was 100%.

To the resulting solution, 1500 g of toluene was added for dilution. The diluted solution was then poured in 100 kg of methanol, and a precipitate was obtained. The resulting precipitate was dried at 80° C. and 140 Pa for 24 hours, and a methacrylic resin [PMMA2] having an Mw of 81400, a molecular weight distribution of 1.08, a syndiotacticity (rr) of 73%, a glass transition temperature of 131° C., and a content of structural unit derived from methyl methacrylate of 100% by mass was obtained.

Production Example 3

An autoclave equipped with a stirrer and a sampling tube, the interior being replaced with nitrogen, and was fed with 100 parts by mass of purified methyl methacrylate, 0.0052 part by mass of 2,2'-azobis(2-methylpropionitrile) (hydrogen abstraction capacity: 1%, 1-hour half-life temperature: 83° C.), and 0.28 part by mass of n-octyl mercaptan, followed by stirring to give a liquid starting material. Into the resulting liquid starting material, nitrogen was introduced, for removing oxygen dissolved in the liquid starting material.

A tank reactor connected to the autoclave via piping was fed to its ⅔ capacity with the liquid starting material. With the temperature maintained at 140° C., a polymerization reaction was started in a batch mode first. When the polymerization conversion ratio reached 55% by mass, the liquid starting material was being fed from the autoclave into the tank reactor at a flow rate so that the mean residence time was 150 minutes, while the reaction product solution was being discharged from the tank reactor at a flow rate corresponding to the flow rate of the liquid starting material being fed, with the temperature being maintained at 140° C. In this way, the polymerization reaction was switched to a continuous-flow mode. The polymerization conversion ratio after switched to a steady state was 55% by mass.

The reaction product solution discharged from the tank reactor in a steady state was fed into a multitubular heat exchanger at an internal temperature of 230° C. at a flow rate so that the mean residence time was 2 minutes, and warmed in the multitubular heat exchanger. The warmed reaction product solution was introduced into a flash evaporation apparatus for removal of volatile matter predominantly composed of an unreacted monomer, and a molten resin was obtained. The molten resin from which volatile matter had thus been removed was fed into a twin screw extruder at an internal temperature of 260° C., and was discharged in the form of a strand. The resulting strand was cut with a pelletizer, and a methacrylic resin [PMMA3] as a pellet having an Mw of 82000, a molecular weight distribution of 1.85, a syndiotacticity (rr) of 52%, a glass transition temperature of 120° C., and a content of structural unit derived from methyl methacrylate of 100% by mass was obtained.

Production Example 4

A methacrylic resin [PMMA4] having an Mw of 103600, a molecular weight distribution of 1.81, a syndiotacticity (rr) of 52%, a glass transition temperature of 120° C., and a proportion of structural unit derived from methyl methacrylate of 100% by mass was obtained in the same process as in Production Example 3 except that the amount of n-octyl mercaptan was changed to 0.225 part by mass.

Production Example 5

A methacrylic resin [PMMA5] having an Mw of 76400, a molecular weight distribution of 1.81, a syndiotacticity (rr) of 53%, a glass transition temperature of 119° C., and a content of structural unit derived from methyl methacrylate of 100% by mass was obtained in the same process as in Production Example 3 except that the amount of n-octyl mercaptan was changed to 0.30 part by mass.

Production Example 6

By mixing 57 parts by mass of the methacrylic resin [PMMA2] and 43 parts by mass of the methacrylic resin [PMMA4], and kneading and extruding the resultant at 250° C. with the use of a twin screw extruder (manufactured by Technovel Corporation, trade name: KZW20TW-45MG-NH-600), a methacrylic resin [PMMA6] was produced.

Sumipex MHF (manufactured by Sumitomo Chemical Company, Limited) was used as a methacrylic resin [PMMA7].

The physical properties of [PMMA1] to [PMMA7] are shown in Table 1.

TABLE 1

| methacrylic resin | PMMA1 | PMMA2 | PMMA3 | PMMA4 | PMMA5 | PMMA6 | PMMA7 |
|---|---|---|---|---|---|---|---|
| MMA unit content [% by mass] | 100 | 100 | 100 | 100 | 100 | 100 | 98.7 |
| weight average molecular weight [g/mol] | 96,100 | 81,400 | 82,000 | 103,600 | 76,400 | 88,600 | 86,600 |
| molocular weight distribution | 1.07 | 1.08 | 1.85 | 1.81 | 1.81 | 1.32 | 1.78 |
| Syndiotacticity(rr) [%] | 83 | 73 | 52 | 52 | 53 | 62 | 46 |
| Glass transition temperature [° C.] | 133 | 131 | 120 | 120 | 119 | 126 | 116 |

* content of unit derived from methyl methacrylate

Polycarbonate resins used in the Examples are shown below, and their physical properties are shown in Table 2.

PC1: manufactured by Mitsubishi Engineering-Plastics Corporation, Iupilon E-2000 (product number), MVR (300° C., 1.2 Kg)=5 cm$^3$/10 min PC2: manufactured by Mitsubishi Engineering-Plastics Corporation, Iupilon HL-4000 (product number), MVR (300° C., 1.2 Kg)=60 cm$^3$/10 min PC3: manufactured by Mitsubishi Engineering-Plastics Corporation, Iupilon HL-8000 (product number), MVR (300° C., 1.2 Kg)=136 cm$^3$/10 min PC4: manufactured by Sumika Styron Polycarbonate Limited, Calibre 301-22 (product number), MVR (300° C., 1.2 Kg)=22 cm$^3$/10 min PC5: manufactured by Sumika Styron Polycarbonate Limited, Calibre 301-40 (product number), MVR (300° C., 1.2 Kg)=40 cm$^3$/10 min PC6: manufactured by Sumika Styron Polycarbonate Limited, SD POLYCA SD-2201 W (product number), MVR (300° C., 1.2 Kg)=115 cm$^3$/10 min PC7: manufactured by Sumika Styron Polycarbonate Limited, SD POLYCA TR-2001 (product number), MVR (300° C., 1.2 Kg)=200 cm$^3$/10 min PC8: manufactured by DOW, DVD1080 (product number), MVR (300° C., 1.2 Kg)=80 cm$^3$/10 min

TABLE 2

| Polycarbonate resin | PC1 | PC2 | PC3 | PC4 | PC5 | PC6 | PC7 | PC8 |
|---|---|---|---|---|---|---|---|---|
| MVR (300° C., 1.2 Kg) [cm3/10 min] | 5 | 60 | 136 | 22 | 40 | 115 | 200 | 80 |
| Weight average molecular weight [g/mol] | 59,500 | 28,100 | 26,400 | 39,000 | 35,300 | 27,200 | 22,100 | 27,800 |
| Molecular weight distribution | 1.96 | 1.91 | 1.94 | 2.06 | 2.01 | 1.90 | 1.81 | 1.92 |
| Glass transition temperature [° C.] | 152 | 145 | 143 | 150 | 148 | 144 | 141 | 145 |

As a processing aid, Paraloid K125-P (manufactured by Kureha Chemicals) was used.

As an ultraviolet absorber, 2,4,6-tris(2-hydroxy-4-hexyloxy-3-methylphenyl)-1,3,5-triazine (manufactured by ADEKA CORPORATION; LA-F70) was used.

Example 1

By mixing 98 parts by mass of the methacrylic resin [PMMA2] and 2 parts by mass of the polycarbonate resin [PC3], and kneading and extruding the resultant at 250° C. with the use of a twin screw extruder (manufactured by Technovel Corporation, trade name: KZW20TW-45MG-NH-600), a methacrylic resin composition [1] was produced. The resulting methacrylic resin composition [1] was subjected to heat press formation to form a platy formed article of 50 mm×50 mm×3.2 mm, which was subjected to measurement of the total light transmittance, the haze, and the glass transition temperature. The physical properties of the methacrylic resin composition [1] are shown in Table 3.

The methacrylic resin composition [1] was dried at 80° C. for 12 hours. The methacrylic resin composition [1] was extruded from a 20-mm-φ single screw extruder (manufactured by OCS) through a T-die of 150-mm wide at a resin temperature of 260° C., and the resultant was taken by rolls having a surface temperature of 85° C. As a result, a non-stretched film having a width of 110 mm and a thickness of 90 μm was obtained. The resulting non-stretched film was subjected to evaluation for surface smoothness, and the results are shown in Table 3.

The non-stretched film thus obtained by the technique described above was cut into a piece of 50 mm×40 mm, which was then mounted in a tensile tester (manufactured by Shimadzu Corporation, AG-IS, 5 kN) with the distance between chucks being set at 40 mm. The test piece was then stretched at a stretching temperature equal to the glass transition temperature+15° C., a stretching speed of 500%/min, and a stretch ratio of 2 in one direction, held for 10 seconds, and then rapidly cooled, whereby a uniaxially stretched film having a thickness of 40 μm was obtained. The resulting uniaxially stretched film was subjected to measurement of the heat shrinkage ratio, the total light transmittance, the haze, and the retardation. The results are shown in Table 3.

Examples 2 to 6, Comparative Examples 1 to 2

Methacrylic resin compositions [2] to [8] were produced in the same manner as in Example 1 except that the ratios in Table 3 were adopted. Each of the resulting methacrylic resin compositions [2] to [8] was subjected to heat press formation to form a platy formed article of 50 mm×50 mm×3.2 mm, which was subjected to measurement of the total light transmittance, the haze, and the glass transition temperature. The physical properties of the methacrylic resin compositions [2] to [8] are shown in Table 3.

Non-stretched films and uniaxially stretched films were obtained in the same manner as in Example 1 except that the methacrylic resin compositions [2] to [1] were used instead of the methacrylic resin composition [1]. The results of evaluation are shown in Table 3.

TABLE 3

| | Ex. | | | | | | Comp. Ex | |
|---|---|---|---|---|---|---|---|---|
| | 1 | 2 | 3 | 4 | 5 | 6 | 1 | 2 |
| methacrylic resin composition | [1] | [2] | [3] | [4] | [5] | [6] | [7] | [8] |
| PMMA1 [parts by mass] | | | | | | | | |
| PMMA2 [parts by mass] | 98 | 96 | 94 | | | | 100 | |
| PMMA3 [parts by mass] | | | | 98 | 96 | 94 | | 98 |
| PC3 [parts by mass] | 2 | 4 | 6 | 2 | 4 | 6 | | |
| processing aid [parts by mass] | | | | | | | | 2 |
| evaluation of methacrylic resin composition | | | | | | | | |
| Total light transmittance [%] | 92 | 92 | 92 | 92 | 92 | 92 | 92 | 90 |
| Haze [%] | 1.2 | 1.3 | 0.9 | 0.4 | 0.7 | 0.5 | 1.1 | 1.1 |
| Tg [° C.] | 131 | 131 | 131 | 120 | 121 | 121 | 131 | 119 |

TABLE 3-continued

| | Ex. | | | | | | Comp. Ex | |
|---|---|---|---|---|---|---|---|---|
| | 1 | 2 | 3 | 4 | 5 | 6 | 1 | 2 |
| evaluation of non-stretched film | | | | | | | | |
| Surface smoothness | A | A | A | A | A | A | A | A |
| evaluation of uniaxially stretched film | | | | | | | | |
| Film thickness [μm] | 40 | 40 | 40 | 40 | 40 | 40 | 40 | 40 |
| Heat shrinkage ratio [%] | 2.7 | 2.6 | 2.6 | 16 | 15 | 14 | 2.7 | 19 |
| Rth [nm] | −5.0 | −1.9 | 3.9 | −2.9 | 1.0 | 5.0 | −7.8 | −6.0 |
| Total light transmittance [%] | 92 | 92 | 92 | 92 | 92 | 92 | 92 | 92 |
| Haze [%] | 0.1 | 0.1 | 0.1 | 0.1 | 0.1 | 0.1 | 0.1 | 0.1 |
| Stretching temperature [° C.] | Tg + 15 | Tg + 15 | Tg + 15 | Tg + 15 | Tg + 15 | Tg + 15 | Tg + 15 | Tg + 15 |

Example 7

By mixing 95 parts by mass of the methacrylic resin [PMMA6], 3 parts by mass of the polycarbonate resin [PC7], and 2 parts by mass of a processing aid, and kneading and extruding the resultant at 250° C. with the use of a twin screw extruder (manufactured by Technovel Corporation, trade name: KZW20TW-45MG-NH-600), a methacrylic resin composition [9] was produced. The resulting methacrylic resin composition [9] was subjected to heat press formation to form a platy formed article of 50 mm×50 mm×3.2 mm, which was subjected to measurement of the total light transmittance, the haze, and the glass transition temperature. The physical properties of the methacrylic resin composition [9] are shown in Table 4.

The methacrylic resin composition [9] was dried at 80° C. for 12 hours. The methacrylic resin composition [9] was extruded from a 20-mm-φ single screw extruder (manufactured by OCS) through a T-die of 150-mm wide at a resin temperature of 260° C., and the resultant was taken by rolls having a surface temperature of 85° C. As a result, a non-stretched film having a width of 110 mm and a thickness of 160 μm was obtained. The resulting non-stretched film was subjected to evaluation for surface smoothness, and the results are shown in Table 4.

The non-stretched film thus obtained by the method described above was cut into a film piece of 100 mm×100 mm, which was then mounted in a pantograph type biaxially stretching tester (manufactured by Toyo Seiki Seisaku-sho, Ltd.). The film piece was then subjected to sequential biaxial stretching at a stretching temperature equal to the glass transition temperature +20° C., a stretching speed of 1000%/min in one direction, and a stretch ratio of 2 in one direction (draw ratio of 4 by area), held for 10 seconds, and then rapidly cooled, whereby a biaxially stretched film having a thickness of 40 μm was obtained. The resulting biaxially stretched film was subjected to measurement of the heat shrinkage ratio, the total light transmittance, the haze, and the retardation. The results are shown in Table 4.

Example 8

The non-stretched film obtained in Example 7 was cut into a film piece of 100 mm×100 mm, which was then mounted in a pantograph type biaxially stretching tester (manufactured by Toyo Seiki Seisaku-sho, Ltd.). The film piece was then subjected to sequential biaxial stretching at a stretching temperature equal to the glass transition temperature+30° C., a stretching speed of 1000%/min in one direction, and a stretch ratio of 2 in one direction (draw ratio of 4 by area), held for 10 seconds, and then cooled, whereby a biaxially stretched film having a thickness of 40 μm was obtained. The resulting biaxially stretched film was subjected to measurement of the heat shrinkage ratio, the total light transmittance, the haze, and the retardation. The results are shown in Table 4.

Example 9

A methacrylic resin composition [10] was produced in the same manner as in Example 7 except that the ratios in Table 4 were adopted. The resulting methacrylic resin composition [10] was subjected to heat press formation to form a platy formed article of 50 mm×50 mm×3.2 mm, which was subjected to measurement of the total light transmittance, the haze, and the glass transition temperature. The physical properties of the methacrylic resin composition [10] are shown in Table 4.

A non-stretched film and a biaxially stretched film having a thickness of 40 μm (biaxially stretched at draw ratio of 4 by area) were obtained in the same manner as in Example 7 except that the methacrylic resin composition [10] was used instead of the methacrylic resin composition [9]. The results of evaluation are shown in Table 4.

Example 10

The non-stretched film obtained in Example 9 was cut into a film piece of 100 mm×100 mm, which was then mounted in a pantograph type biaxially stretching tester (manufactured by Toyo Seiki Seisaku-sho, Ltd.). The film piece was then subjected to sequential biaxial stretching at a stretching temperature equal to the glass transition temperature+30° C., a stretching speed of 1000%/min in one direction, and a stretch ratio of 2 in one direction (draw ratio of 4 by area), held for 10 seconds, and then cooled, whereby a biaxially stretched film having a thickness of 40 μm was obtained. The resulting biaxially stretched film was subjected to measurement of the heat shrinkage ratio, the total light transmittance, the haze, and the retardation. The results are shown in Table 4.

Examples 11 to 12, Comparative Examples 3 to 12

Methacrylic resin compositions [11] to [22] were produced in the same manner as in Example 7 except that the ratios in Table 4 and Table 5 were adopted. Each of the resulting methacrylic resin compositions [11] to [22] was subjected to heat press formation to form a platy formed article of 50 mm×50 mm×3.2 mm, which was subjected to measurement of the total light transmittance, the haze, and the glass transition temperature. The physical properties of the methacrylic resin compositions [11] to [22] are shown in Table 4 and Table 5.

Non-stretched films and biaxially stretched films having a thickness of 40 μm (biaxially stretched at draw ratio of 4 by area) were obtained in the same manner as in Example 7 except that the methacrylic resin compositions [11] to [22] were used instead of the methacrylic resin composition [9]. The results of evaluation are shown in Table 4 and Table 5.

The materials and the composition in Comparative Example 12 were the same as in Example 1 of JP 2012-51997 A.

TABLE 4

| | Ex. | | | | | |
|---|---|---|---|---|---|---|
| | 7 | 8 | 9 | 10 | 11 | 12 |
| Methacrylic resin composition | [9] | [9] | [10] | [10] | [11] | [12] |
| PMMA1 [part by mass] | | | | | | 91 |
| PMMA4 [part by mass] | | | | | 96 | |
| PMMA6 [part by mass] | 95 | 95 | 93 | 93 | | |
| PC7 [part by mass] | 3 | 3 | 5 | 5 | 3.5 | 7 |
| Processing aid [part by mass] | 2 | 2 | 2 | 2 | | 2 |
| UV absorber [part by mass] | | | | | 0.5 | |
| evaluation of methacrylic resin composition | | | | | | |
| Total light transmattance [%] | 91 | | 91 | | 90 | 91 |
| Haze [%] | 1.3 | | 1.2 | | 1.3 | 1.5 |
| Tg [° C.] | 125 | | 125 | | 120 | 133 |
| evaluation of non-stretched film | | | | | | |
| Surface smoothness | A | | A | | A | A |
| evaluation of biaxially stretched film | | | | | | |
| Film thickness [μm] | 40 | 40 | 40 | 40 | 40 | 40 |
| Heat shrinkage ratio [%] | 1.9 | 1.0 | 2.0 | 0.9 | 2.6 | 0.4 |
| Rth [nm] | −2.4 | −1.2 | 4.8 | 0.7 | 1.0 | 5.0 |
| Re [nm] | −0.5 | −0.5 | 1.3 | 1.2 | −0.3 | 2 |
| Total light transmittance [%] | 92 | 92 | 92 | 92 | 92 | 92 |
| Haze [%] | 0.1 | 0.1 | 0.1 | 0.1 | 0.1 | 0.1 |
| Stretching properties | A | A | A | A | A | A |
| Stretching temperature [° C.] | Tg + 20 | Tg + 30 | Tg + 20 | Tg + 30 | Tg + 20 | Tg + 20 |

TABLE 5

| | Comp. Ex. | | | | | | | | | |
|---|---|---|---|---|---|---|---|---|---|---|
| | 3 | 4 | 5 | 6 | 7 | 8 | 9 | 10 | 11 | 12 |
| Methacrylic resin composition | [13] | [14] | [15] | [16] | [17] | [18] | [19] | [20] | [21] | [22] |
| PMMA2 [part by mass] | 100 | | 96 | | | | | | | |
| PMMA3 [part by mass] | | 98 | | | | | | | | |
| PMMA5 [part by mass] | | | | | | | | 96 | | |
| PMMA6 [part by mass] | | | | 96 | 96 | 96 | 96 | | | |
| PMMA7 [part by mass] | | | | | | | | | 96 | 90 |
| PC1 [part by mass] | | | 4 | | | | | | | |
| PC2 [part by mass] | | | | 4 | | | | | | |
| PC4 [part by mass] | | | | | 4 | | | | | |
| PC5 [part by mass] | | | | | | 4 | | | | |
| PC6 [part by mass] | | | | | | | 4 | | 4 | 10 |
| PC7 [part by mass] | | | | | | | | 4 | | |
| Processing aid [part by mass] | | 2 | | | | | | | | |
| evaluation of methacrylic resin composition | | | | | | | | | | |
| Total light transmittance [%] | 92 | 90 | 69 | 86 | 49 | 93 | 97 | 92 | 91 | 91 |
| Haze [%] | 1.1 | 1.1 | 51.4 | 6.9 | 59.7 | 4.0 | 3.3 | 1.2 | 1.2 | 1.3 |
| Tg [° C.] | 131 | 119 | 131 | 126 | 126 | 126 | 126 | 119 | 117 | 117 |
| evaluation of non-stretched film | | | | | | | | | | |
| Surface smoothness | A | A | B | B | B | B | A | A | A | A |
| evaluation of biaxially stretched film | | | | | | | | | | |
| Film thickness [μm] | 40 | 40 | 40 | 40 | 40 | 40 | 40 | 40 | 40 | 40 |
| Heat shrinkage ratio [%] | 0.4 | 3.0 | 0.4 | 0.9 | 0.9 | 0.8 | 0.9 | 3.2 | 4.1 | 3.7 |
| Rth [nm] | −23 | −16 | −0.4 | −0.3 | −0.3 | −0.4 | −0.3 | −0.8 | −0.5 | 20 |
| Re [nm] | −1.0 | −1.0 | 0.3 | 0.3 | 0.3 | 0.3 | 0.3 | 0.3 | 0.3 | 3.4 |
| Total light transmittance [%] | 92 | 92 | 90 | 92 | 90 | 92 | 92 | 92 | 92 | 92 |
| Haze [%] | 0.1 | 0.1 | 2.5 | 0.3 | 4.4 | 0.3 | 0.3 | 0.1 | 0.1 | 0.1 |
| Stretching properties | B | A | B | A | B | A | A | B | B | B |
| Stretching temperature [° C.] | Tg + 20 | Tg + 20 | Tg + 20 | Tg + 20 | Tg + 20 | Tg + 20 | Tg + 20 | Tg + 20 | Tg + 20 | Tg + 20 |

Example 13

The methacrylic resin composition [9] was dried at 80° C. for 12 hours. The methacrylic resin composition [9] was extruded from a 20-mm-φ single screw extruder (manufactured by OCS) through a T-die of 150-mm wide at a resin temperature of 260° C., and the resultant was taken by rolls having a surface temperature of 85° C. As a result, a non-stretched film having a width of 110 mm and a thickness of 80 µm was obtained. The resulting non-stretched film was subjected to evaluation for surface smoothness, and the results are shown in Table 6.

The non-stretched film thus obtained by the method described above was cut into a film piece of 100 mm×100 mm, which was then mounted in a pantograph type biaxially stretching tester (manufactured by Toyo Seiki Seisaku-sho, Ltd.). The film piece was then subjected to sequential biaxial stretching at a stretching temperature equal to the glass transition temperature +30° C., a stretching speed of 500%/min in one direction, and a stretch ratio of 2 in one direction (draw ratio of 4 by area), held for 10 seconds, and then cooled, whereby a biaxially stretched film having a thickness of 20 µm was obtained. The resulting biaxially stretched film was subjected to measurement of the heat shrinkage ratio, the total light transmittance, the haze, and the retardation. The results are shown in Table 6.

Example 14, Comparative Examples 13 to 14

Methacrylic resin compositions [23] and [24] were produced in the same manner as in Example 13 except that the ratios in Table 6 were adopted. Each of the resulting methacrylic resin compositions [23] and [24] was subjected to heat press formation to form a platy formed article of 50 mm×50 mm×3.2 mm, which was subjected to measurement of the total light transmittance, the haze, and the glass transition temperature. The physical properties of the methacrylic resin compositions [23] and [24] are shown in Table 6.

Non-stretched films and biaxially stretched films having a thickness of 20 µm (biaxially stretched at draw ratio of 4 by area) were obtained in the same manner as in Example 13 except that the methacrylic resin compositions [10], [23], and [24] were used instead of the methacrylic resin composition [9]. Evaluation was performed, and the results are shown in Table 6.

Comparative Example 15

In the same manner as in Example 1 of JP 2013-148655 A, a MMA/PhMI copolymer consisting of methacrylic acid methyl in an amount of 90% by mass and N-phenylmaleimide (PhMI) in an amount of 10% by mass was obtained. The resulting copolymer had a weight average molecular weight of 48000, a molecular weight distribution of 2.04, a syndiotacticity (rr) of 47%, and a glass transition temperature of 125° C.

To 100 parts by mass of the resulting MMA/PhMI copolymer, 2 parts by weight of the polycarbonate resin [PC8] was mixed in a molten state at 260° C. to obtain a methacrylic resin composition [25]. The resulting methacrylic resin composition [25] was subjected to heat press formation to form a platy formed article of 50 mm×50 mm×3.2 mm, which was subjected to measurement of the total light transmittance, the haze, and the glass transition temperature. The physical properties of the methacrylic resin composition [25] are shown in Table 6.

The methacrylic resin composition [25] was dried at 80° C. for 12 hours. The methacrylic resin composition [25] was extruded from a 20-mm-φ single screw extruder (manufactured by OCS) through a T-die of 150-mm wide at a resin temperature of 260° C., and the resultant was taken by rolls having a surface temperature of 85° C. As a result, a non-stretched film having a width of 110 mm and a thickness of 240 µm was obtained. In the same manner as in Example 1 of JP 2013-148655 A, the resulting film was subjected to sequential biaxial stretching at a stretching speed of 200%/minute in one direction, 125° C. (the glass transition temperature ±0 degree), and a stretch ratio of 2 in one direction (draw ratio of 4 by area), held for 10 seconds, and then cooled. The resulting film was fragile and broke, indicating that a stretched film was not successfully obtained.

The non-stretched film obtained by the method described above was cut into a film piece of 100 mm×100 mm, which was then mounted in a pantograph type biaxially stretching tester (manufactured by Toyo Seiki Seisaku-sho, Ltd.). The film piece was then subjected to sequential biaxial stretching at a stretching temperature equal to the glass transition temperature +30° C., a stretching speed of 500%/min in one direction, and a stretch ratio of 2 in one direction (draw ratio of 4 by area), held for 10 seconds, and then cooled. The resulting film was fragile and broke, indicating that a stretched film was not successfully obtained.

(Polarizer)

A polyvinyl alcohol film having an average polymerization degree of 2400, a degree of saponification of 99.9 mol %, and a thickness of 75 µm was immersed in warm water at 30° C. for 60 seconds to make the film swollen. The resultant was then stretched to 3.5 times while being dyed in a 0.3% by weight iodine solution (weight ratio: iodine/potassium iodide=0.5/8) at 30° C. for 1 minute. The resultant was then stretched to a total stretch ratio of 6 while being immersed in a 4% by weight aqueous boric acid solution at 65° C. for 0.5 minute. The resultant thus stretched was dried in an oven at 70° C. for 3 minutes, and a polarizer having a thickness of 22 µm was obtained.

(Polarizer Protective Film A)

By mixing 16.8 g of polyester urethane (manufactured by Dai-ichi Kogyo Seiyaku Co., Ltd., trade name: Superflex 210, solid content: 33%), 4.2 g of a crosslinking agent (oxazoline containing polymer, manufactured by Nippon Shokubai Co., Ltd., trade name: Epocros WS-700, solid content: 25%), 2.0 g of a 1% by weight aqueous ammonia solution, 0.42 g of colloidal silica (manufactured by Fuse Chemical Co., Ltd., Quartron PL-3, solid content: 20% by weight), and 76.6 g of deionized water, a adhesiveness enhancing composition was obtained.

The resulting adhesiveness enhancing composition was applied with a bar coater to the biaxially stretched film of Example 8 on its corona-discharge-treatment surface, which was a surface that had received corona discharge treatment, in such a way that the thickness after drying was 100 nm. The resulting film was placed in a hot-air dryer (110° C.) for about 5 minutes to dry the adhesiveness enhancing composition, and a adhesiveness enhancing layer was formed.

(Protective Film for Polarizer B)

A triacetylcellulose film having a thickness of 40 µm was immersed in a 10% aqueous sodium hydroxide solution (60° C.) for 30 seconds for saponification, followed by water washing for 60 seconds, and a second polarizer protective film was obtained.

(Adhesive Composition)

In deionized water, 100 parts by weight of a polyvinyl alcohol resin having an acetoacetyl group (average degree of polymerization: 1200, degree of saponification: 98.5 mol %, degree of modification with acetoacetyl group: 5 mol %) and 20 parts by weight of methylol melamine were dissolved under conditions at a temperature of 30° C., and an aqueous solution having a solid content of 0.5% was obtained. The resulting aqueous solution was used below as an adhesive composition under conditions at a temperature of 30° C.

The adhesive composition, 30 minutes after preparation, was applied to the adhesiveness enhancing layer of the polarizer protective film A in such a way that the thickness after drying was 50 nm. In the same manner, the adhesive composition was applied to one side of the polarizer protective film B. The polarizer protective film A and the polarizer protective film B were then overlaid respectively on either side of a polarizer with a small laminator, with the adhesive composition present therebetween. The resultant was placed in a hot-air dryer (70° C.) for 5 minutes for drying, and a polarizing plate X was obtained. The resulting polarizing plate X was placed in a thermo-hygrostat at 80° C. and 90% RH for 100 hours and then visually observed for the extent of degradation of the polarizer. No degradation was observed.

ing a structural unit derived from methyl methacrylate in an amount of not less than 92% by mass and a polycarbonate resin having an MVR from 130 to 250 $cm^3/10$ min as measured under conditions of 300° C. and 1.2 Kg are used, the resulting resin composition and the resulting film have excellent transparency and small retardation in the thickness direction.

It has also been proven that when comprising a methacrylic resin having a triad syndiotacticity (rr) of not less than 50% and a weight average molecular weight from 80000 to 200000 and also comprising a structural unit derived from methyl methacrylate in an amount of not less than 92% by mass, the film has excellent heat resistance, does not easily shrink, and has excellent stretching properties.

The film of the present invention has excellent stretching properties, and therefore can be stretched into a thinner film having a thickness of not more than 40 μm.

TABLE 6

|  | Ex. | | Comp. Ex. | | |
| --- | --- | --- | --- | --- | --- |
|  | 13 | 14 | 13 | 14 | 15 |
| Methacrylic resin composition | [9] | [10] | [23] | [24] | [25] |
| PMMA6 [part by mass] | 95 | 93 |  |  |  |
| PMMA7 [part by mass] |  |  | 98 | 95 |  |
| MMA/PhMI copolymer[part by mass] |  |  |  |  | 100 |
| PC3 [part by mass] |  |  |  | 3 |  |
| PC7 [part by mass] | 3 | 5 |  |  |  |
| PC8 [part by mass] |  |  |  |  | 2 |
| Processing aid [part by mass] | 2 | 2 | 2 | 2 |  |
| evaluation of methacrylic resin composition | | | | | |
| Total light transmittance [%] | 91 | 91 | 91 | 87 | 85 |
| Haze [%] | 1.3 | 1.2 | 1.2 | 3.5 | 7.2 |
| Glass transition temperature [° C.] | 125 | 125 | 116 | 116 | 125 |
| evaluation of non-stretched film | | | | | |
| Surface smoothness | A | A | A | A | B |
| evaluation of biaxially stretched film | | | | | |
| Film thickness [μm] | 20 | 20 | 20 | 20 | — |
| Heat shrinkage ratio [%] | 1.2 | 1.1 | 4.7 | 4.5 | — |
| Rth [nm] | −0.5 | 0.2 | −7 | 0.4 | — |
| Re [nm] | −0.5 | 1.3 | −1.0 | −0.4 | — |
| Total light transmittance [%] | 92 | 92 | 92 | 92 | — |
| Haze [%] | 0.1 | 0.1 | 0.1 | 0.3 | — |
| Stretching properties | A | A | B | B | B |
| Stretching temperature [° C.] | Tg + 30 | Tg + 30 | Tg + 30 | Tg + 30 | Tg + 30 |

The adhesive composition, 30 minutes after preparation, was applied to the adhesiveness enhancing layer of the polarizer protective film B in such a way that the thickness after drying was 50 nm. Two pieces of such polarizer protective film B were then overlaid respectively on either side of a polarizer with a small laminator, with the adhesive composition present therebetween. The resultant was placed in a hot-air dryer (70° C.) for 5 minutes for drying, and a polarizing plate Y was obtained. The resulting polarizing plate Y was placed in a thermo-hygrostat at 80° C. and 90% RH for 100 hours and then visually observed for the extent of degradation of the polarizer. Degradation was observed all over the surfaces.

As proven from the examples and the comparative examples, when a methacrylic resin having a triad syndiotacticity (rr) of not less than 50% and a weight average molecular weight from 80000 to 200000 and also compris-

EXPLANATION OF SYMBOLS

11: polarizer
12: adhesive-agent layer
13: adhesiveness enhancing layer
14: polarizer protective film
15: adhesive-agent layer
16: optical film

The invention claimed is:
1. A film comprising a methacrylic resin composition, the methacrylic resin composition comprising:
a methacrylic resin having a triad syndiotacticity (rr) of not less than 50% and a weight average molecular weight of 80000 to 200000 and comprising not less than 92% by mass of a structural unit derived from methyl methacrylate, and a polycarbonate resin having a melt volume-flow rate of 130 to 250 cm³/10 min at a temperature of 300° C. and a load of 1.2 kg;

in which a mass ratio of the methacrylic resin to the polycarbonate resin is from 91/9 to 99/1, and a total content of the methacrylic resin and the polycarbonate resin is 80 to 100% by mass.

2. The film according to claim 1, having a thickness of 10 to 50 μm.

3. The film according to claim 1, wherein the methacrylic resin has the syndiotacticity (rr) of not less than 58% and not more than 85%.

4. The film according to claim 1, wherein the methacrylic resin comprises not less than 99% by mass of the structural unit derived from methyl methacrylate.

5. The film according to claim 1, the film being a biaxially stretched film having an area based draw ratio of 1.5 to 8.

6. A polarizer protective film, comprising the film according to claim 1.

7. A polarizing plate, comprising a polarizer and at least one of the polarizer protective film according to claim 6 layered on the polarizer.

8. The polarizing plate according to claim 7, wherein the polarizer comprises a polyvinyl alcohol resin having a degree of polymerization from 100 to 5000, and a dichroic substance.

9. The polarizing plate according to claim 7, further comprising adhesive-agent layer between the polarizer and the polarizer protective film.

10. The polarizing plate according to claim 7, further comprising an adhesiveness enhancing layer provided by adhesiveness enhancing treatment or performing a method of forming an anchor layer.

11. The film according to claim 1, wherein the methacrylic resin has a ratio of the weight average molecular weight to the number average molecular weight of 1.2 to 2.0.

12. The film according to claim 1, wherein the methacrylic resin has a melt flow rate of 0.1 to 5 g/10 min.

13. The film according to claim 1, wherein the methacrylic resin has a glass transition temperature of not less than 120° C.

14. The film according to claim 1, wherein the polycarbonate resin has a weight average molecular weight of 15000 to 28000.

15. The film according to claim 1, wherein the polycarbonate resin has a glass transition temperature of not less than 130° C.

16. The film according to claim 1, wherein the methacrylic resin composition has a melt flow rate of 0.1 to 6 g/10 min.

17. The film according to claim 1, wherein the methacrylic resin composition has a haze under 3.2 mm-thick of not more than 3.0%.

18. The film according to claim 1, having a haze under 50 μm-thick of not more than 0.2%.

19. The film according to claim 1, having an in-plane direction retardation Re of not more than 5 nm.

20. The film according to claim 1, having a thickness direction retardation Rth of not less than −5 nm and not more than 5 nm.

* * * * *